(12) United States Patent
Hoshan et al.

(10) Patent No.: US 12,480,401 B2
(45) Date of Patent: Nov. 25, 2025

(54) MANAGING PIPELINE CORROSION IN OIL AND GAS PRODUCTION

(71) Applicant: Saudi Arabian Oil Company, Dhahran (SA)

(72) Inventors: Tarik Hoshan, Dhahran (SA); Raed Samanoodi, Dhahran (SA); Ameen Obedan, Saihat (SA); Christian Canto Maya, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 311 days.

(21) Appl. No.: 17/991,099

(22) Filed: Nov. 21, 2022

(65) Prior Publication Data
US 2024/0167379 A1    May 23, 2024

(51) Int. Cl.
E21B 49/00    (2006.01)

(52) U.S. Cl.
CPC .................. E21B 49/003 (2013.01)

(58) Field of Classification Search
CPC .... E21B 49/003; E21B 43/00; E21B 2200/22; E21B 47/006
See application file for complete search history.

(56) References Cited

U.S. PATENT DOCUMENTS

| | | | |
|---|---|---|---|
| 6,885,948 B2 | 4/2005 | Dupuis et al. | |
| 6,889,888 B2 | 5/2005 | Dupuis et al. | |
| 8,612,164 B2 | 12/2013 | Huyse et al. | |
| 10,255,058 B2 | 4/2019 | Frank et al. | |
| 2011/0196621 A1* | 8/2011 | Huyse | F16L 1/036 702/34 |
| 2020/0165509 A1 | 5/2020 | Zhang et al. | |

(Continued)

FOREIGN PATENT DOCUMENTS

| | | | | |
|---|---|---|---|---|
| CN | 107525733 A | * | 12/2017 | ............. G01N 33/00 |
| CN | 116440850 A | * | 7/2023 | |
| WO | WO-2021181369 A1 | * | 9/2021 | ............... F17D 5/06 |

OTHER PUBLICATIONS

Obedan et al., "Novel Method for the Automated Alignment of In-Line Inspection 15. (ILI) Features," NACE Paper MECCOCT18-12598, Middle East Corrosion Conference, Oct. 2018, 7 pages (Year: 2018).*

(Continued)

*Primary Examiner* — Douglas Kay
(74) *Attorney, Agent, or Firm* — Fish & Richardson P.C.

(57) ABSTRACT

The present disclosure describes methods and systems, including computer-implemented methods, computer program products, and computer systems, for managing corrosions in oil and gas pipelines. One computer-implemented method includes: obtaining, by one or more hardware processors, a first dataset and a second dataset; performing, by one or more hardware processors, a feature mapping operation that matches one or more corrosion features in the first dataset to corresponding features in the second dataset, wherein the feature mapping operation comprises a joint matching process, a girth weld coordinate transformation process, and an iterative closest point (ICP) process; determining, by one or more hardware processors, a corrosion growth rate based on an output of the feature mapping operation; and outputting, by one or more hardware processors, the output of the feature mapping operation in a user interface.

15 Claims, 17 Drawing Sheets

(56) References Cited

U.S. PATENT DOCUMENTS

| | | |
|---|---|---|
| 2020/0379142 A1 | 12/2020 | Gerling et al. |
| 2024/0019086 A1* | 1/2024 | Pirsiavash .............. G01N 17/00 |
| 2024/0117944 A1* | 4/2024 | Pirsiavash ................ F17D 5/06 |
| 2024/0233858 A1 | 7/2024 | Nasser et al. |

OTHER PUBLICATIONS

Dawson, Jane, and et al. "Identification of coincident features in pipelines using ILI data." In International Pipeline Conference, vol. 45134, pp. 27-37. American Society of Mechanical Engineers, 2012 (Year: 2012).*

Zhou, Ruikun. "A Kullback-Leiber Divergence Filter for Anomaly Detection in Non-Destructive Pipeline Inspection." PhD diss., Université d'Ottawa/University of Ottawa, 2020 (Year: 2020).*

Dann, Markus R., and Christoph Dann. "Automated matching of pipeline corrosion features from in-line inspection data." Reliability Engineering & System Safety 162 (2017): 40-50 (Year: 2017).*

Du L, Zhong R, Sun H, Pang Y, Mo Y. Dislocation detection of shield tunnel based on dense cross-sectional point clouds. IEEE Transactions on Intelligent Transportation Systems. Mar. 16, 2022;23(11):22227-43 (Year: 2022).*

Baldani et al., "The family Rhodospirillaceae," In The Prokaryotes: Alphaproteobacteria and Betaproteobacteria, Rosenberg et al., (Eds. ), fourth ed. Springer-Verlag, Berlin, 2014, pp. 533-618, 86 pages.

Dann et al., "Automated Matching of Pipeline Corrosion Features from In-line Inspection Data," Reliability Engineering & System Safety, 2017, 162:40-50, 31 pages.

Dinh et al., "Iron corrosion by novel anaerobic microorganisms," Nature, 2004, 427:829-832, 4 pages.

Jayaraman et al., "Inhibiting sulfate-reducing bacteria in biofilms on steel with antimicrobial peptides generated in situ," Appl. Microbiol Biotechnol, 1999, 52, 267-275, 9 pages.

Kelly et al., "Halothiobacillus," In Bergey's Manual of Systematic Bacteriology (second ed.), vol. 2, Springer (eds.), New York, 2003, 58-59, 26 pages.

Nasser et al., "Characterization of microbiologically influenced corrosion by comprehensive metagenomic analysis of an inland oil field," Gene, 2021, 774:145425, 7 pages.

Nasser et al., "Characterization of microbiologically influenced corrosion in pipelines by using metagenomics," Dissertation in Partial Fulfillment of the Requirements For the Degree of Doctor of Philosophy, Mar. 2019, 82 pages.

Nessim et al., "Obtaining Corrosion Growth Rates From Repeat In-Line Inspection Runs and Dealing With the Measurement Uncertainties," Proceedings of IPC 7th International Pipeline Conference, Calgary, Alberta, Canada, 2008, 8 pages.

Obedan et al., "Novel Method for the Automated Alignment of In-Line Inspection (ILI) Features," NACE Paper MECCOCT18-12598, Middle East Corrosion Conference, Oct. 2018, 7 pages.

Russell et al., "Advances in magnetic flux leakage signal matching and corrosion growth rate selection," Pigging Products & Services Association, 2016, 16 pages.

Shi et al., "Theory and Application of Magnetic Flux Leakage Pipeline Detection," Sensors, 2015, 15(12):31036-31055, 20 pages.

Smith et al., "Corrosion Growth and Remnant Life Assessment: How to Pick the Right Approach for Your Pipeline," Proceedings of IPC 7th International Pipeline Conference, Calgary, Alberta, Canada, 2016, 14 pages.

Sooknah et al., "Monitoring Microbiologically Influenced Corrosion: A Review Of Techniques," NACE Paper No. NACE-07517, 2007, 17 pages.

Sooknah et al., "Validation Of A Predictive Model For Microbiologically Influenced Corrosion," NACE Paper No. NACE-08503, 2008, 17 pages.

Tingyue et al., "A new mechanistic model for MIC based on a biocatalytic cathodic sulfate reduction theory," NACE No. 09390, NACE Corrosion Conference & Expo, 2009, 12 pages.

Tripathi et al., "Gene Sets and Mechanisms of Sulfate-Reducing Bacteria Biofilm Formation and Quorum Sensing With Impact on Corrosion," Frontiers in Microbiology, Oct. 2021, 12:754140, 18 pages.

SAIP Examination Report in Saudi Arabian Appln. No. 123450832, dated Jan. 20, 2025, 17 pages.

* cited by examiner

MANAGING PIPELINE CORROSION IN OIL AND GAS PRODUCTION

TECHNICAL FIELD

This disclosure relates to a computer software program that interacts with oil and gas production equipment and, more specifically, based on estimated corrosion growth rate of oil and gas pipeline.

BACKGROUND

In an oil and gas (O&G) production field, a vast networks of carbon steel pipelines are used for oil and gas transmission. These pipelines are frequently inspected to monitor the corrosion status.

SUMMARY

The present disclosure describes methods and systems, including computer-implemented methods, computer program products, and computer systems for determining corrosion growth rate for oil and gas pipeline and adjusting production operations. One computer-implemented method includes: obtaining, by one or more hardware processors, a first dataset and a second dataset, wherein the first dataset comprises information of a first plurality of corrosion features detected in a first inspection of an oil and gas pipeline, and the second dataset comprises information of a second plurality of corrosion features detected in a second inspection of the oil and gas pipeline; performing, by one or more hardware processors, a feature mapping operation that matches one or more corrosion features in the first dataset to corresponding features in the second dataset, wherein the feature mapping operation comprises a joint matching process, a girth weld coordinate transformation process, and an iterative closest point (ICP) process; determining, by one or more hardware processors, a corrosion growth rate based on an output of the feature mapping operation; and outputting, by one or more hardware processors, the output of the feature mapping operation in a user interface.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the subsequent description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure. Thus, the present disclosure is not intended to be limited to the described or illustrated implementations but is to be accorded the widest scope consistent with the principles and features disclosed in this disclosure.

In some cases, non-destructive testing (NDT) technologies are used to detect corrosion features in the pipelines. One example of the NDT technologies is In-line Inspection (ILI). ILI can be conducted periodically, for example, every few years. In each inspection, the ILI tools generate raw signals that are processed to produce ILI data sets. The ILI data sets include information of corrosion features on the pipeline detected by the ILI tool. Example of the information of each corrosion feature in the dataset includes location coordinates, size, and depth of the corrosion feature. Each corrosion feature represents an anomaly on the pipeline that is detected during the inspection.

In some cases, the corrosion growth rate can be determined by matching the corrosion features of ILI data sets generated in consecutive inspections. This disclosure describes a system that automatically maps the corrosion features in two ILI data sets by using a combination of joint-to-joint matching, girth welds coordinate transformation, and modified ICP processes. The outcome of the feature mapping is used to calculate corrosion growth rate. The corrosion growth rate is used to determine the pipeline Mean Time To Failure (MTTF).

Techniques described herein produce one or more technical effects. In some cases, conditions of the inspected pipeline and inaccuracy of the inspection instrument datasets may cause misalignment of the features in different datasets and creates errors the feature mapping operations. By using the joint matching and transformation process in the disclosed techniques, the features in different datasets are aligned to improve the accuracy of the matching operation. In addition, the techniques can provide an automated tool to monitor corrosion growth rate of pipeline in the field. The techniques can further provide an interactive interface for operators to adjust inputs of different estimate parameters and obtain corresponding results. Moreover, the techniques can provide automatic control of field equipment and adjust field operations based on the estimated corrosion growth rate.

Figure 1:
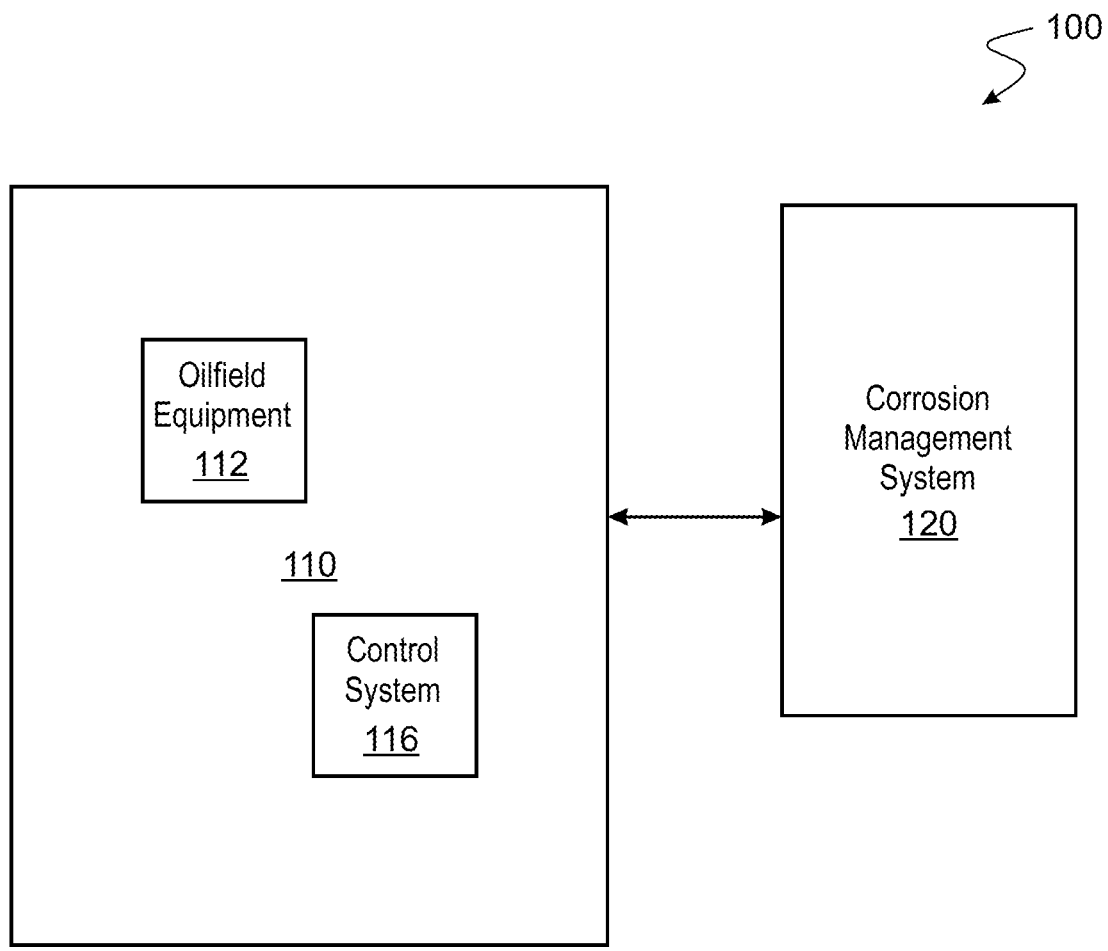
FIG. 1 is a schematic diagram showing an example oil and gas production system, according to an implementation.

FIG. 1 is a schematic diagram showing an example oil and gas production system 100, according to an implementation. At a high level, the oil and gas production system 100 includes a field operation system 110 and a corrosion management system 120.

The field operation system 110 includes a combination of oilfield equipment 112 that operates in a reservoir to produce oil. The oilfield equipment 112 includes drilling rigs, pipelines, pumps, tanks, and other equipment used in the reservoir.

The field operation system 110 includes a control system 116. The control system 116 includes controllers that control the operation of the oilfield equipment 112. For example, the controllers can include valves that can be configured to open or close pipelines, switches that can turn the drilling rigs on or off, controllers that can adjust the speed of the pumps, or any combination thereof. The control system 116 also includes hardware sensors that monitor and measure operating parameters of the production operations. Example of the sensors can include temperature sensors, pressure sensors, motion sensors, audio sensors, visual sensors, or any combination thereof. In some implementations, part or all of the control system 116 can be implemented on corresponding equipment of the oilfield equipment 112.

The corrosion management system 120 represents an application, a set of applications, software, software modules, hardware, or any combination thereof that can be configured to determine the corrosion growth rate of pipeline leaks in the field operation system 110. The corrosion management system 120 can include an interactive user interface to provide corrosion feature matching results based on the inspection data sets and configured parameters.

Figure 2:
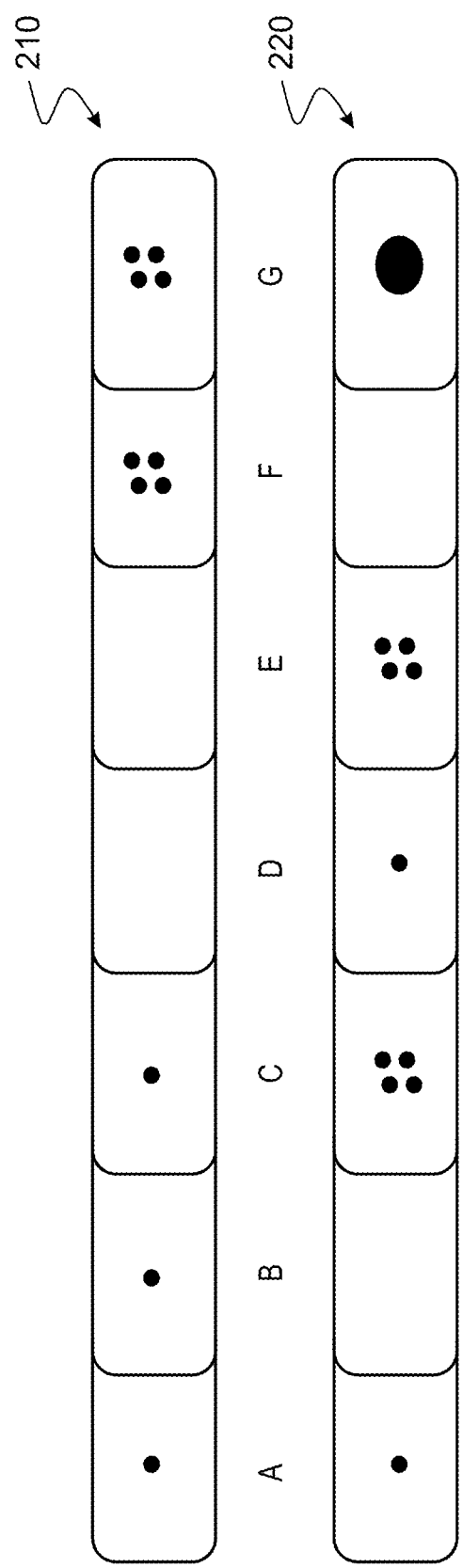
FIG. 2 illustrates an example of feature matching cases for corrosion management, according to an implementation.

FIG. 2 illustrates an example of feature matching cases for corrosion management, according to an implementation. FIG. 2 illustrates the matching of features in ILI datasets 210 and 220. In FIG. 2, seven different matching cases are shown, each is represented with a different letter.

One to One (A).

In this case, a single corrosion feature in the ILI data set 210 is matched with its correspondence in the ILI data set 220. The matched feature may differ in size (for example, sizes of metal loss), dimensions (for example, length or width), or both. The size and dimensions may increase, decrease or remain unchanged depending on the pipeline health in addition to the inspection data accuracy and quality.

One to None (B)

In this case, a single corrosion feature in the ILI data set 210 has no match in the ILI data set 220. This may be due to one or more of the following reasons:
1—Failure to detect the same feature in the ILI data set 220.
2—The original reported feature was a false positive.
3—The feature is close to the reporting threshold.

One to Multiple (C)

In this case, a single corrosion feature in the ILI data set 210 is found as multiple features in the ILI data set 220. This may indicate that initiation of new corrosion features has occurred between the two inspections.

None to One (D)

In this case, a single corrosion feature appears in the ILI data set 220, but does not have a match in the ILI data set 210. This may be due to one or more of the following reasons:
1—Initiation of new corrosion feature.
2—Failure to detect this feature in the ILI data set 210.
3—The feature was under the reporting or detection threshold in the ILI data set 210.

None to Multiple (E)

This case similar to case D, with the difference of the appearance of multiple features in the ILI data set 220 instead of a single feature.

Multiple to None (F)

In this case, multiple corrosion features in the ILI data set 210 have no match in the ILI data set 220. This may be due to one or more of the following reasons:
1—Failure to detect the same features in the ILI data set 220.
2—The original reported features were a result of false positives.
3—The features are close to the reporting threshold.

Multiple to One (G)

In this case, multiple corrosion features in the ILI data set 210 are found to be grouped (clustered) as a single feature in the ILI data set 220. The growth of a localized distribution of multiple corrosion features in the duration between two ILI can result in merging them into a single feature sized to enclose the clustered original corrosion features.

Figure 3:
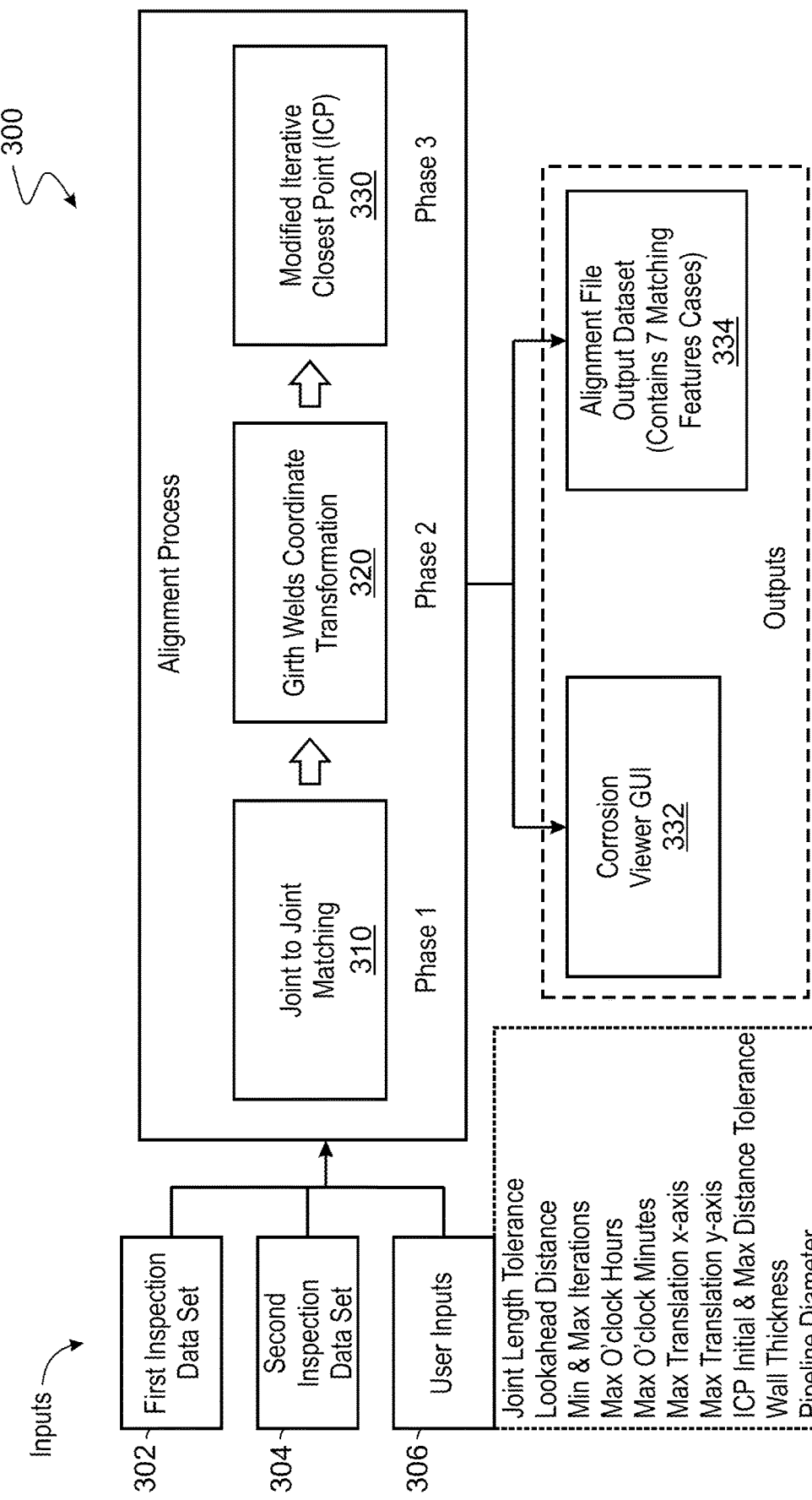
FIG. 3 illustrates an example corrosion management process, according to an implementation.

FIG. 3 illustrates an example corrosion management process 300, according to an implementation. The corrosion management process 300 can be performed by the corrosion management system 120 in FIG. 1. It will be understood that the corrosion management process 300 may be performed, for example, by other suitable system, environment, software, and hardware, or a combination of systems, environments, software, and hardware, as appropriate. In some implementations, various steps of the corrosion management process 300 can be run in parallel, in combination, in loops, or in any order.

The corrosion management process 300 includes three phases, the joint-to-joint matching phase 310, the girth welds coordinate transformation process 320, and the modified iterative closest point (ICP) process 330. The corrosion management process 300 takes the inputs of two ILI data sets (the first data set 302 and the second data set 304), and user input 306. The corrosion management process 300 generates output of corrosion viewer GUI 332 and alignment file 334. FIGS. 4-9 and associated descriptions provide additional details of these implementations.

Figure 4:
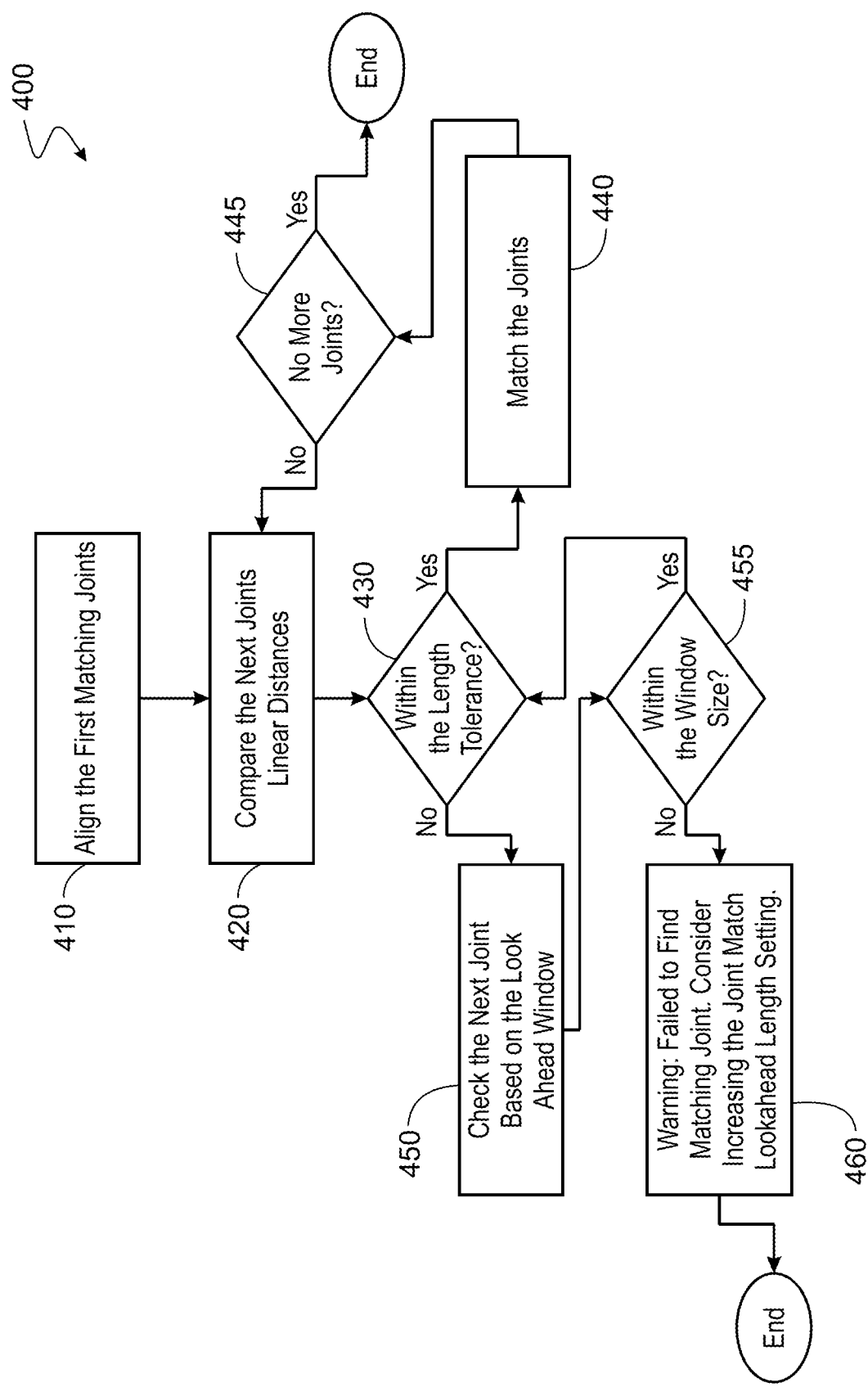
FIG. 4 illustrates an example joint-to-joint matching process, according to an implementation.

FIG. 4 illustrates an example joint-to-joint matching process 400, according to an implementation. The joint-to-joint matching process 400 is performed during the joint-to-joint matching phase 310 in FIG. 3.

A pipeline may include small segments. In some cases, each segment may have a length between 10 to 24 meters. These segments are joined by girth welds. Although inspection instruments have relatively good accuracy, in some cases, a slight mismatch in calibration or different conditions may be encountered between two inspection runs. As a result, different distances may be measured. Such errors are cumulative and can exhibit either positive or negative differences that progress along the pipeline. Cumulated errors for measured distances may reach 20 meters over a 50 km pipeline.

In some implementations, the joint-to-joint matching process 400 can be used for matching girth welds between the first and second inspection runs. To match the exact girth weld for the two inspections, a joint tolerance threshold is used to overcome the challenge of different starting points of inspection process. The joint tolerance threshold can be set to a default value by the corrosion management system 120. Alternatively, or additionally, the joint tolerance threshold can be set or adjusted by the user of the corrosion management system 120, for example, as one of the user input 306 illustrated previously in FIG. 3.

From each of the data set 302 and 304, two sets of joint numbers (j1 and j2 for each of the respective inspection runs) and two sets of distances (d1 and d2 for each of the respective inspection runs) are extracted. The index of these sets starts at zero, and each element in the set corresponds to a different segment in sequence.

The following parameters are used in the joint-to-joint matching process 400:

Maximum acceptable segment length difference (l): this parameter represents difference due to the slips or downs of the tool as an operational process. In some cases, this parameter can be set to a value between 15 to 30 cm. This parameter accounts for the situations where the inspection tool may experience abnormal slowdowns or accelerations along the pipeline.

Window size (w): this parameter represents the look ahead window to find matching joints in case a match is not found following the previous match. In some cases, this parameter can be set to 2.5 times the regular pipeline segment length for this pipeline under inspection. For example, if the pipeline has a pipeline segments of 12 meters length, this parameter may be set to 30 meters. This parameter can be set to a default value by the corrosion management system 120. Alternatively, or additionally, this parameter can be set or adjusted by the user of the corrosion management system 120, for example, as one of the user input 306 illustrated previously in FIG. 3.

The joint-to-joint matching process 400 starts at step 410, where the first matching joints in the two sets (first element in the sets j1 and j2) are aligned. At 420, the linear distances between the next joint and the first joint in each set (d1 and d2 in sets j1 and j2) are compared. At 430, the differences between these two distances are compared with the joint tolerance threshold.

If the difference is determined to be within the joint tolerance threshold, the joint-to-joint matching process 400 progresses from 430 to 440, where these two joints are matched. In that case, the joint-to-joint matching process 400 continues from 440 to 445, to determine whether there are additional joints (next element in the sets j1 and j2). If there are no additional joints, the joint-to-joint matching process 400 ends. If there are additional joints, the joint-to-joint matching process 400 continues from 445 to 420, where the distance between the next joint and the previous joint is compared, and the joint-to-joint matching process 400 continues as discussed previously.

If the difference is determined to be beyond the joint tolerance threshold, the joint-to-joint matching process 400 progresses from 430 to 450, where the corrosion management system 120 finds the next joint in the sets j1 and j2, respectively. At 455, the corrosion management system 120 determines whether the distance to the next joint is within the look ahead window size. If the distance to the next joint is within the look ahead window size, the joint-to-joint matching process 400 progresses from 455 to 430, where the distance to the next joint is used to compare and determine whether the differences are within the joint tolerance threshold. In some cases, the distance to the next joint in one of the sets (j1 or j2) is used to compare with the distance previously obtained in 420 for the other set. Alternatively, or additionally, the distances to the next joint in both sets are compared.

If the distance to the next joint is beyond the look ahead window size, the joint-to-joint matching process 400 progresses from 455 to 460, where a notification is outputted. The notification indicates that there is a failure to find joint matching. In some cases, the joint-to-joint matching process 400 can be repeated by increasing the look ahead window size. The amount of increase can be set to a default value by the corrosion management system 120. Alternatively, or additionally, the amount of increase can be set or adjusted by the user of the corrosion management system 120, for example, as one of the user input 306 illustrated previously in FIG. 3.

The joint segment matching is used to identify the segment where the anomaly is located. Basically, the joint matching is the chainage alignment (odometer matching). After the chain alignment the ICP algorithm matched the anomaly cloud looking for the radial components and longitudinal components, in the identified segment, taking as reference point the initial joint matching.

Figure 5:
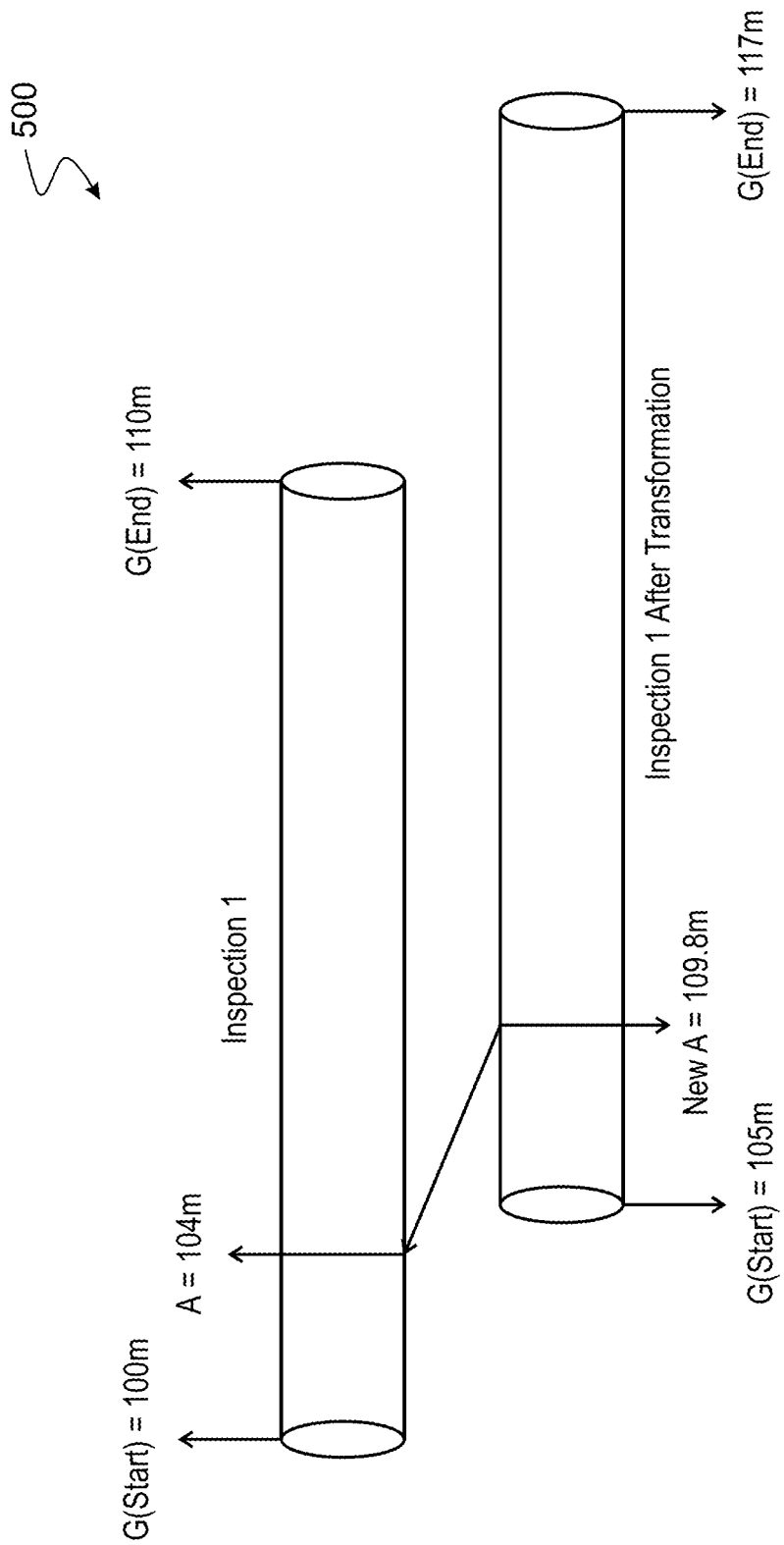
FIG. 5 illustrates an example diagram for girth welds coordinate transformation, according to an implementation.

FIG. 5 illustrates an example diagram 500 for girth welds coordinate transformation, according to an implementation. The girth welds and feature matching calculation is performed during the girth welds coordinate transformation process 320 in FIG. 3.

In some implementations, pipeline girth welds are matched before feature matching. As discussed previously, girth welds are used to join segments in a pipeline. To match the girth welds in the two data sets, the feature coordinate system is transformed. The pipeline can be viewed as being cut open at the twelve o'clock position and flattened. As such, the pipeline is transformed to a rectangle with the length of the pipeline as length and the perimeter of the pipeline as width.

The angle relative to 12 o'clock is thus converted to a y position by multiplying the angle hour position by $\pi/6$, minute position by $\pi/360$, and then multiplying the resulting angle by the pipeline radius. The pipeline radius can change over the length of the pipeline.

The features are then split into distinct sets belonging to pipeline segments that have been matched. For example, let's consider the respective matching start and end distances $d_{start}^1$, $d_{end}^1$ and $d_{start}^2$, $d_{end}^2$ for a single pipeline segment, for the first and second inspection, respectively. For each feature belonging to the first inspection, the distance coordinate $d_{original}$ of each feature is transformed into $d_{transformed}$ as follows:

$$d_{transformed} = d_{start}^2 + (d_{original} - d_{start}^1)\frac{d_{start}^2 - d_{end}^2}{d_{start}^1 - d_{end}^1}$$

As the example shown in FIG. 5, the $d_{start}^1$, $d_{end}^1$ and $d_{start}^2$, $d_{end}^2$ are 100 m, 110 m, 105 m, and 117 m, respectively. $d_{original}$ is 104 m, and the $d_{transformed}$ is 109.8 m.

The transformation process is performed on the feature data of the first inspection data set to obtain a transformed feature data set. The transformed feature data set of the first inspection data set and the original feature data set of the second inspection data set are used in the next process, the modified ICP process.

After the coordinate transformation process, the modified iterative closest point (ICP) process is performed for feature mapping, as illustrated in step 330 in FIG. 3. The modified ICP process can be used for matching corrosion features with the nearest neighbor(s). In some cases, a customized ICP algorithm with linear constraints on point-cloud translations in the x and y directions can be used to align anomalies.

Figure 6A:
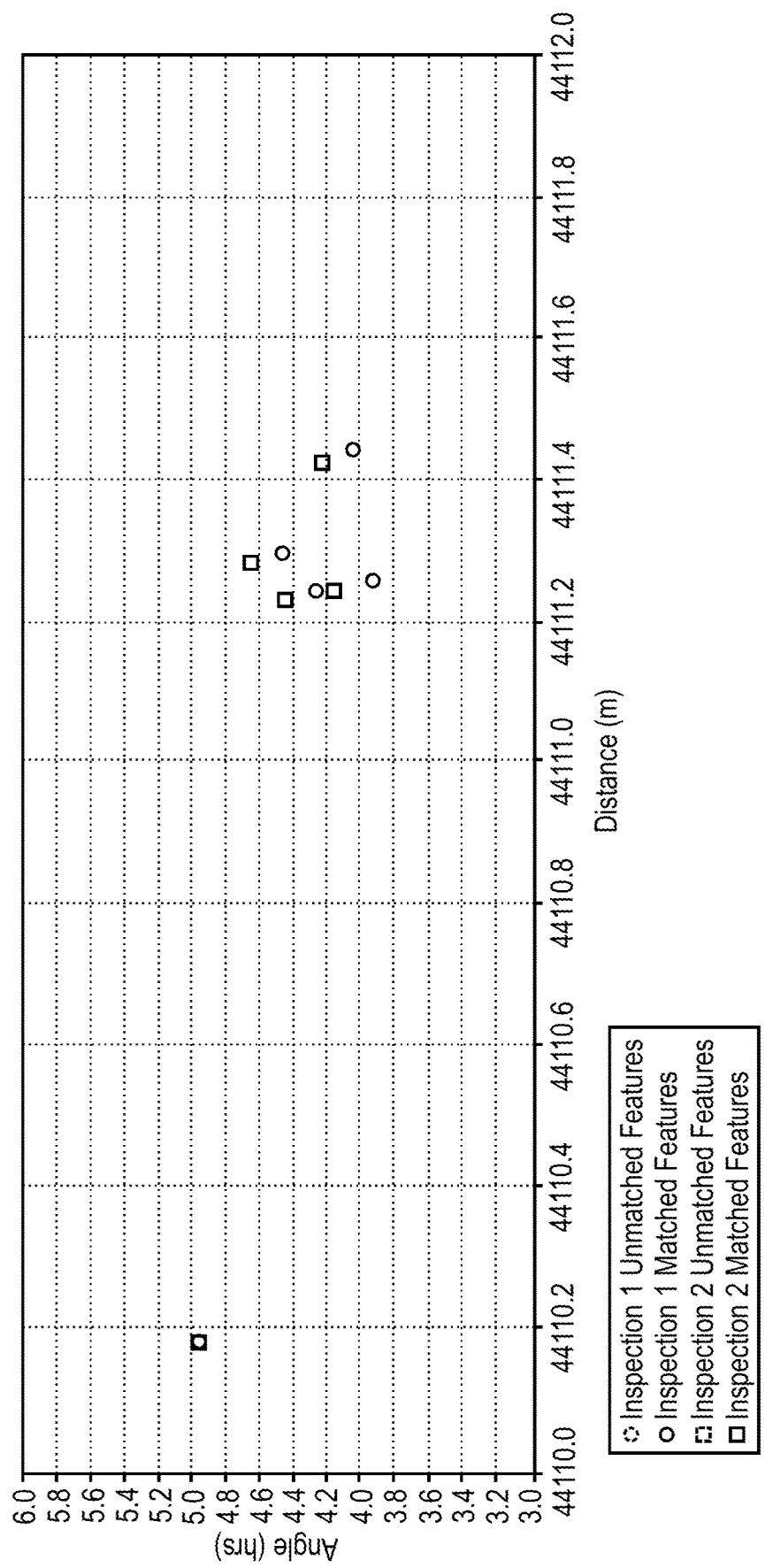
FIGS. 6A and 6B illustrate an example modified iterative closest point (ICP) algorithm, according to an implementation.
Figure 6B:
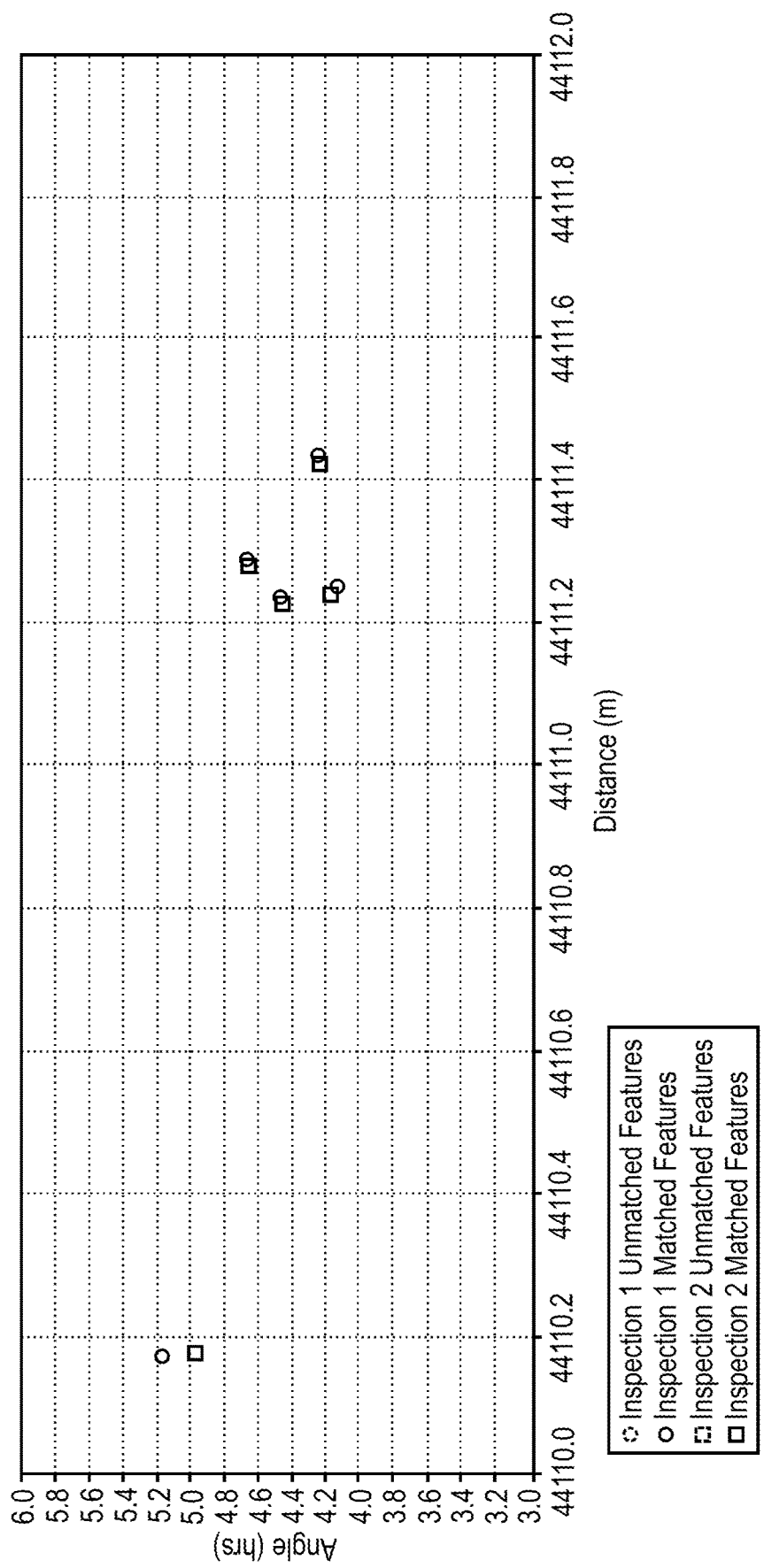

The modified ICP algorithm is applied to two clouds of points, one pipeline segment at a time. This approach can translate the points representing the first inspection features either longitudinally or transversally so as to align them with their corresponding points representing the features in the second inspection. FIGS. 6A and 6B illustrate an example modified ICP algorithm, according to an implementation. FIG. 6A includes a diagram 610 that illustrates the locations of features in two inspections prior to the ICP process. FIG. 6B includes a diagram 620 that illustrates the locations of features in two inspections after the ICP process. As illustrated, the set of features belonging to the first inspection are shifted upward to align with the features belonging to the second inspection after the modified ICP process is performed.

The modified ICP process can be performed in the following steps:

Step 1: Match each point belonging to the first inspection to the closest point in the second inspection, unless the distance is above a certain threshold.

Let $p_i$ represent the $i^{th}$ corrosion feature in inspection 1 and $q_j$ represent the $j^{th}$ feature in inspection 2. For each feature $p_i$, determine feature $q_k$ such that:

$$\text{distance}(p_i,q_k) \leq \text{distance}(p_i,q_j) \forall j \neq k$$

Step 2: Translate in the x and y direction to minimize the sum of the square of the distances between pairs of points determined in the previous step.

Let s represent the set of pairs of points, where the set is indexed such that pair $s_i$ contains $p_i$, $q_i$.

Let $t_x$ and $t_y$ represent the translation in the x and y direction respectively. Based on the following equation:

$$f(tx,ty) = \Sigma_i (p_{i_x} + t_x - q_{i_x})^2 + (p_{i_y} + t_y - q_{i_y})^2$$

Determine $$\min_{tx,ty} f(tx,ty)$$

the first partial derivatives are obtained as follows:

$$\frac{\partial f}{\partial t_x} = 2\sum_i t_x + p_{i_x} - q_{i_x} = 2nt_x + 2\sum_i p_{i_x} - 2\sum_i q_{i_x}$$

$$\frac{\partial f}{\partial t_y} = 2\sum_i t_y + p_{i_y} - q_{i_y} = 2nt_y + 2\sum_i p_{i_y} - 2\sum_i q_{i_y}$$

The second partial derivatives are obtained as follows:

$$\frac{\partial^2 f}{\partial t_x^2} = \frac{\partial^2 f}{\partial t_y^2} = 2n$$

-continued $$\frac{\partial^2 f}{\partial t_x \partial t_y} = 0$$

The first and second partial derivatives are used to set up the Jacobian and Hessian to be passed to the quadratic optimizer.

Step 3: Translate all points of inspection 1 as per vector calculated in step 2, and update each point $p_i$ such that: $p_{i_x} = p_{i_x} + t_x$ and $p_{i_y} = p_{i_y} + t_y$ Step 4: If $t_x \geq \varepsilon$ or $t_y \geq \varepsilon$, then proceed to step 1 and repeat the process, otherwise the process terminates.

Translations in both horizontal and vertical directions may be limited to a maximum that reflects possible deviations in reality. This can be achieved by setting constraints on both $t_x$ and $t_y$ such that $|t_x| \leq \alpha$ and $|t_y| \leq \beta$.

The feature mapping is performed by determining whether, after the ICP transformation discussed, a feature in the first inspection data set is within the max distance of a corresponding feature in the second inspection data set. In some cases, the maximum distance for feature mapping can be set based on $\alpha$ and $\beta$. For example, maximum distance=$\sqrt{(\alpha^2+\beta^2)}$ based on Max Euclid distance.

In some cases, the parameters such as the maximum distance, $\alpha$, $\beta$, or any combination thereof can be set to a default value by the corrosion management system 120. Alternatively, or additionally, these parameters can be set or adjusted by the user of the corrosion management system 120, for example, as one of the user input 306 illustrated previously discussed in FIG. 3. The values of these parameters may lead to a tradeoff between a number of matches and matching accuracy. For example, a high value may lead to more matches but possibly with more false positives and fewer false negatives. A low value may lead to fewer false positives and more false negatives.

Figure 7:
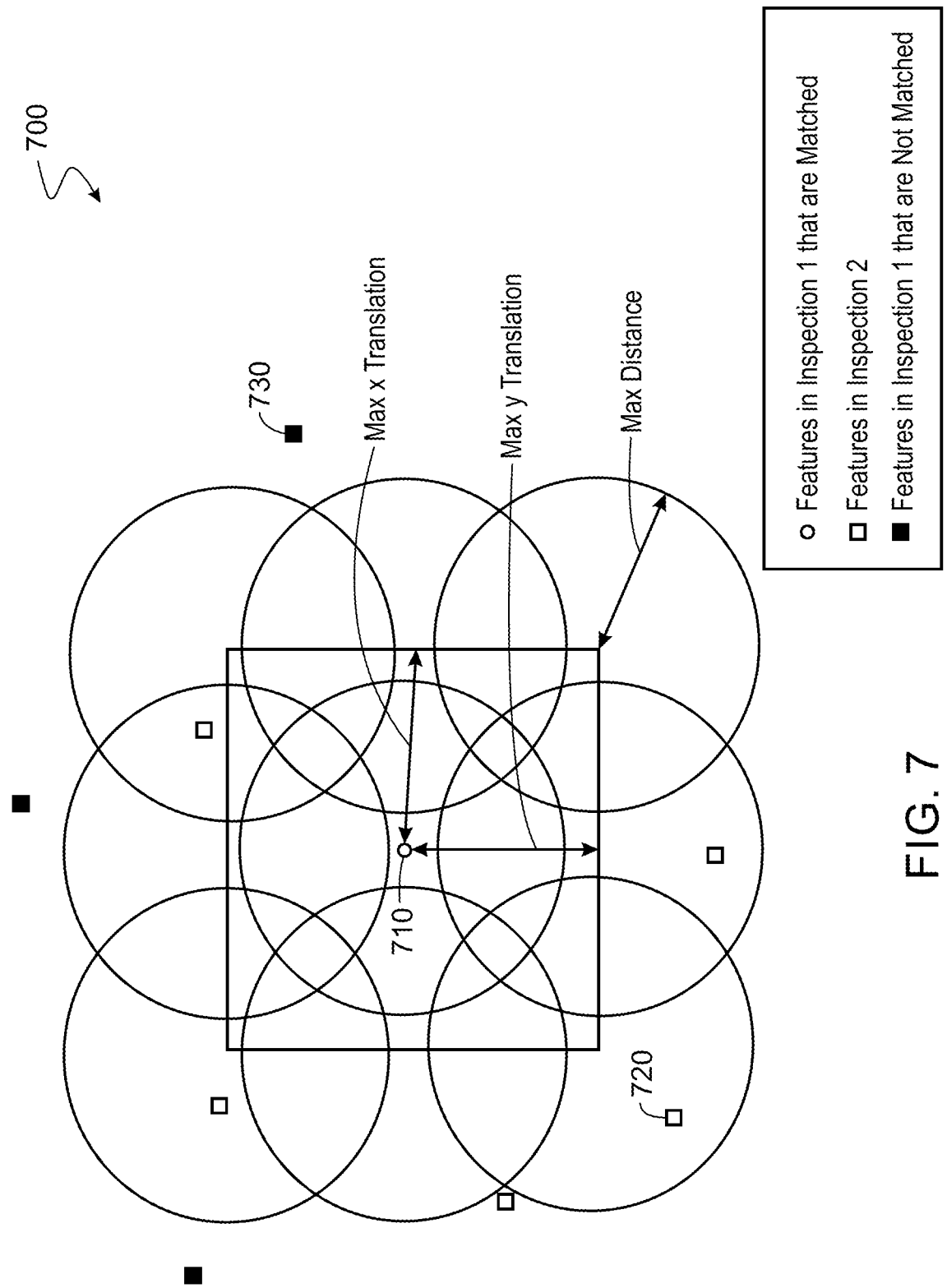
FIG. 7 illustrates an example diagram showing the effects of the parameters used in the ICP process, according to an implementation.

FIG. 7 illustrates an example diagram 700 showing the effects of the parameters used in the ICP process, according to an implementation. The diagram 700 includes a feature 710 that is found in inspection 2. The diagram 700 also includes features 720 found in inspection 1 that are matched to the feature 710 because their distance to the feature 710 is within the max distance after the transformation in the ICP process. The diagram 700 also includes features 730 found in inspection 1 that are not matched to the feature 710 because their distance to the feature 710 is larger than the max distance after the transformation in the ICP process.

Figure 8A:
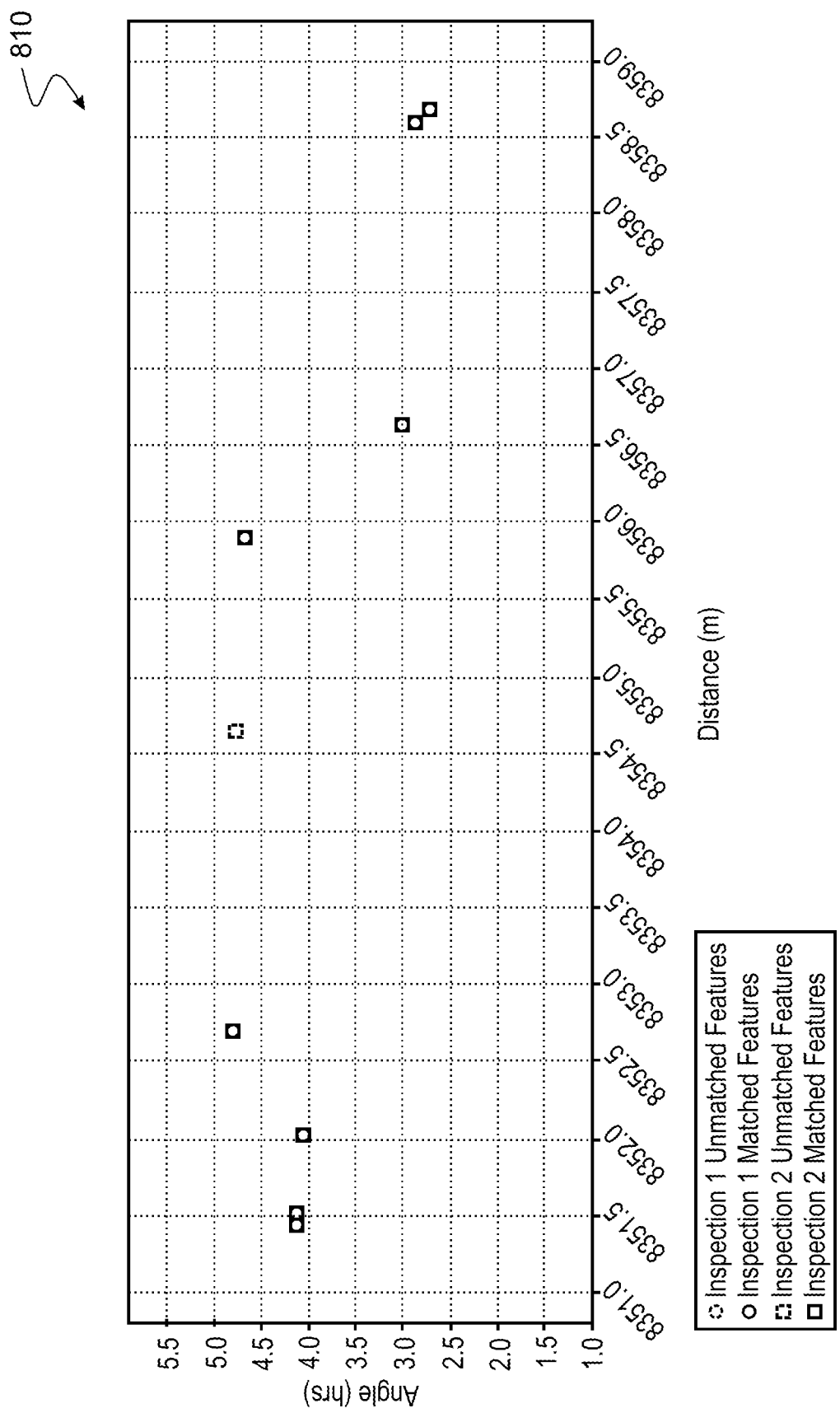
FIGS. 8A, 8B, and 8C illustrate examples results of the feature mapping process, according to an implementation.
Figure 8B:
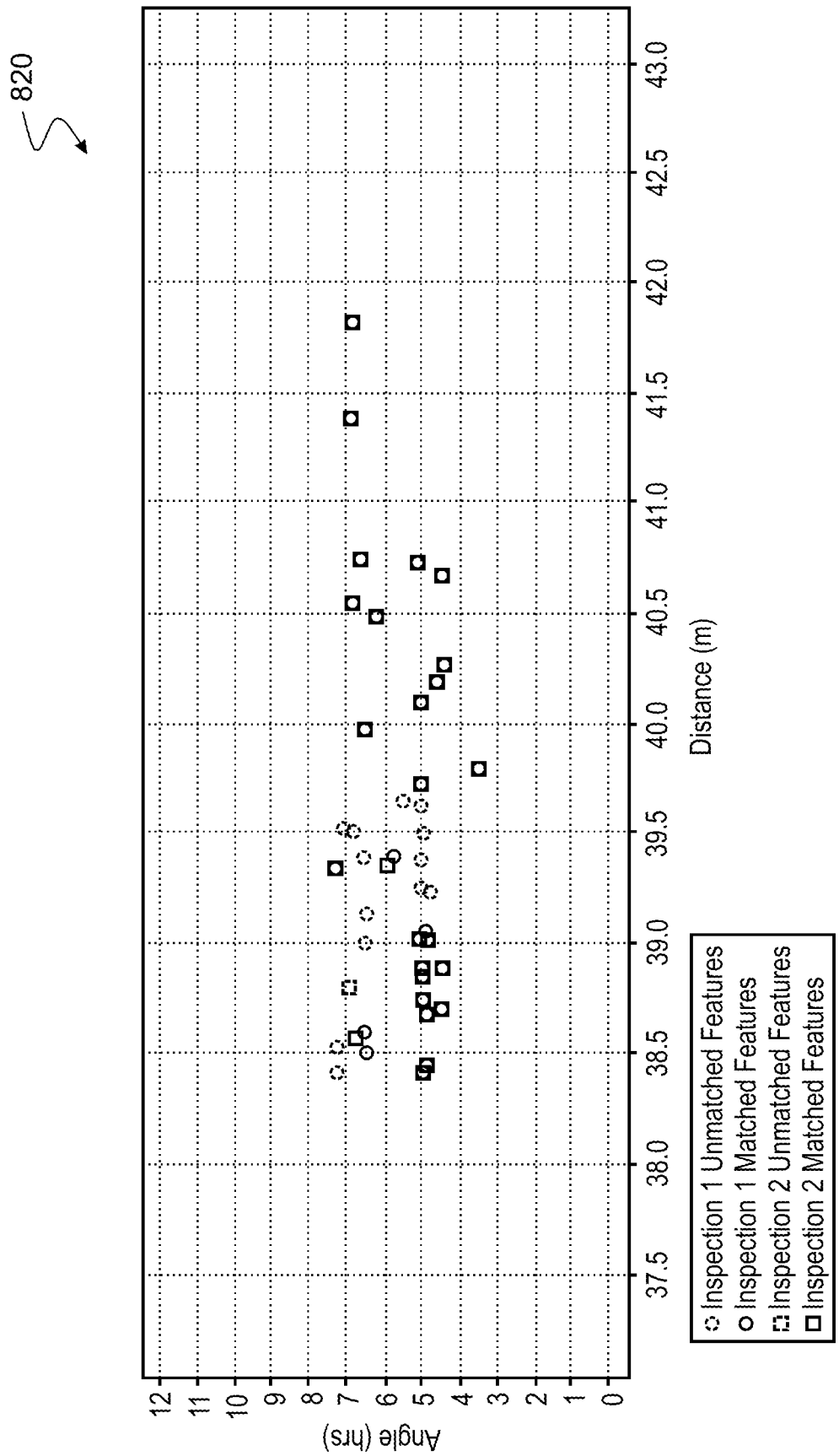
Figure 8C:
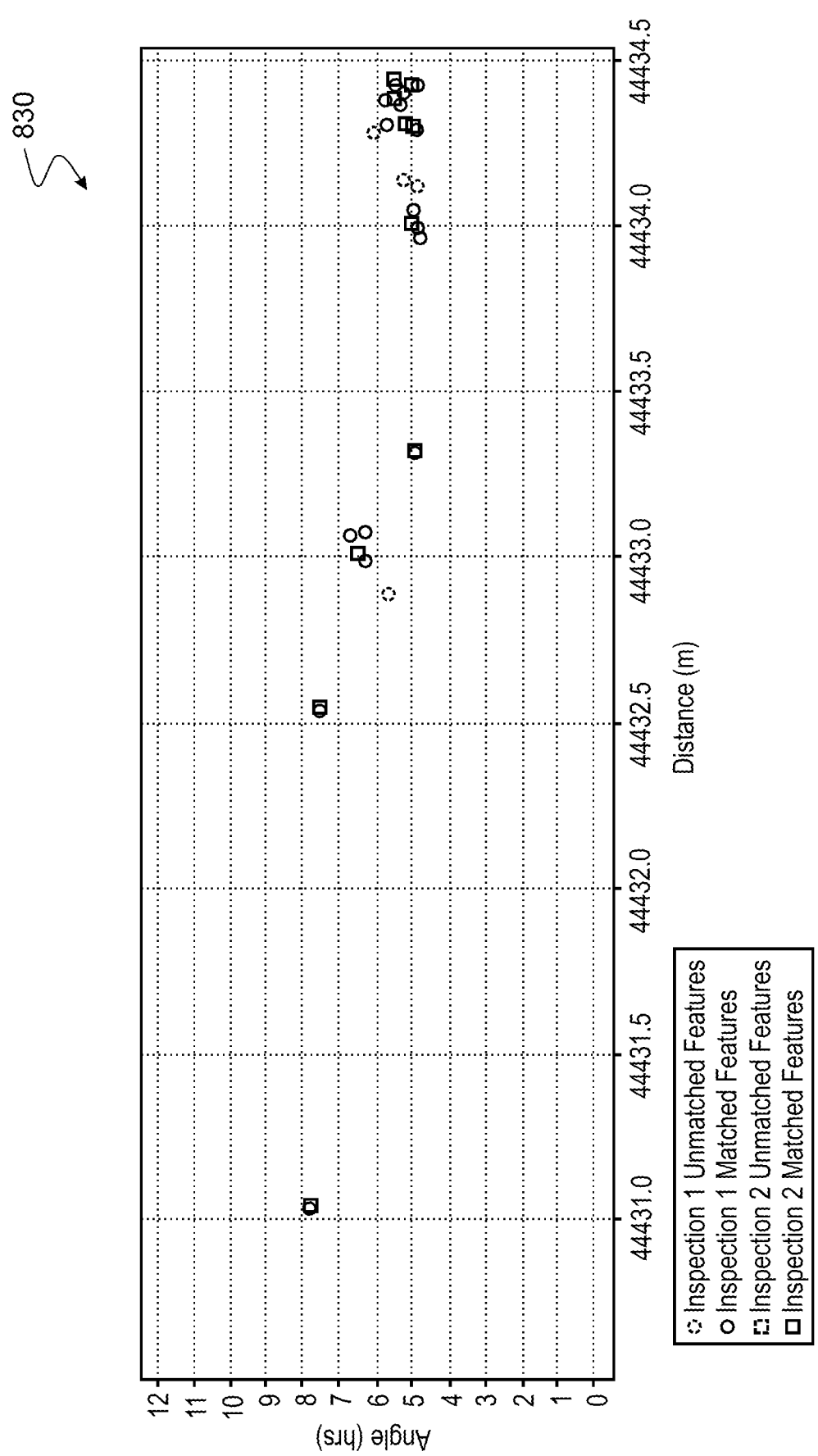
Figure 9A:
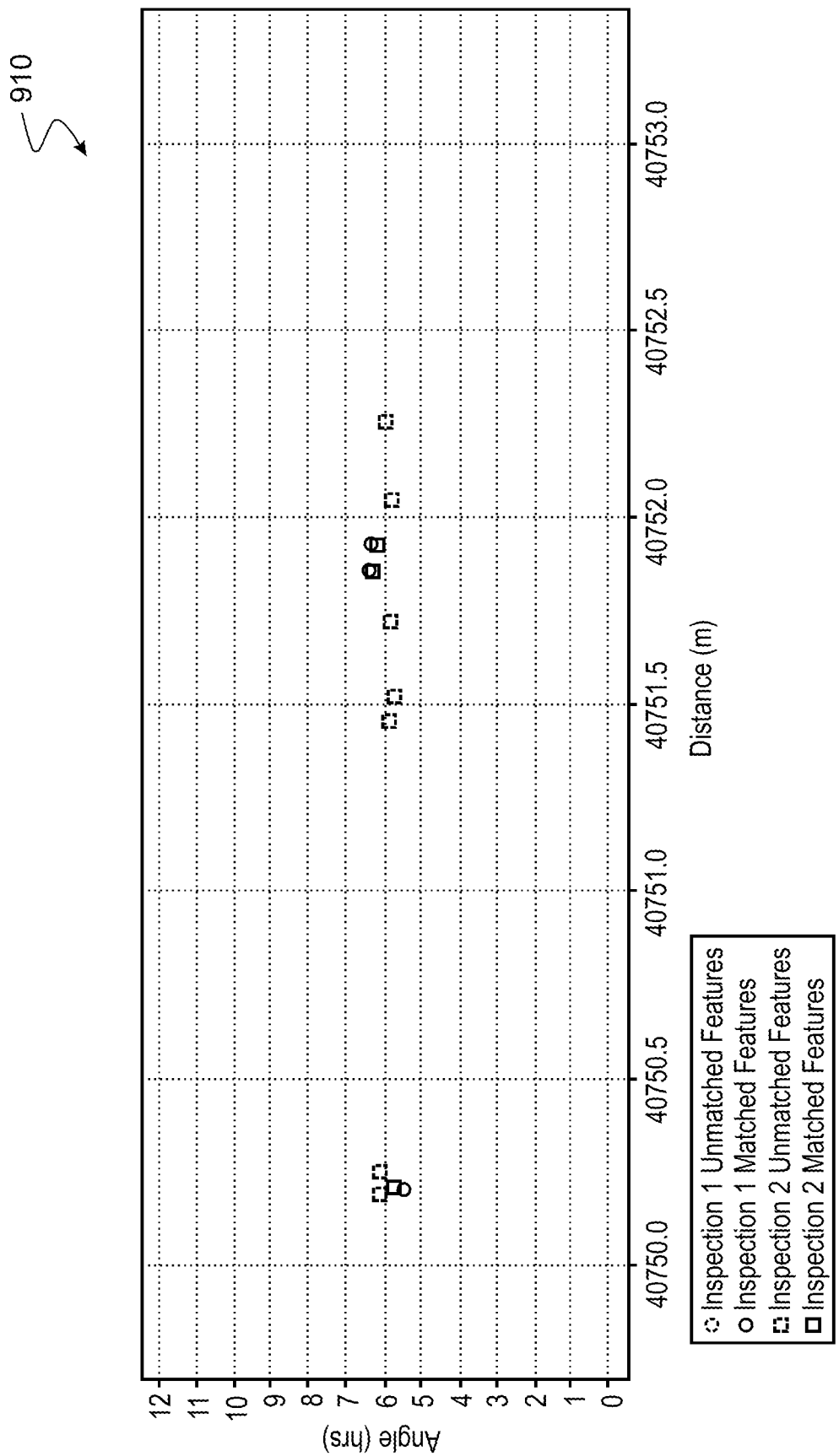
FIGS. 9A, 9B, 9C, and 9D illustrate additional examples results of the feature mapping process, according to an implementation.
Figure 9B:
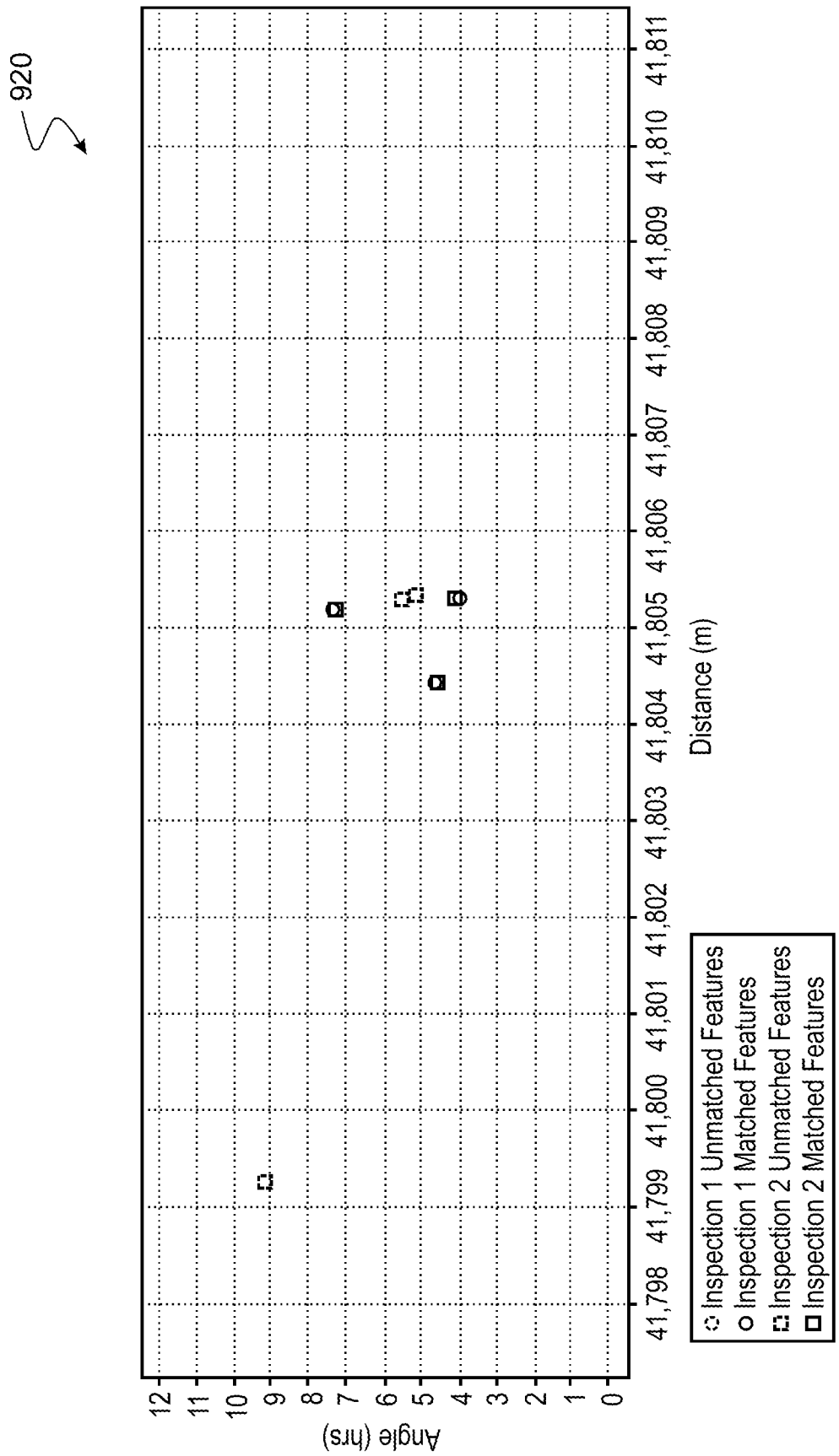
Figure 9C:
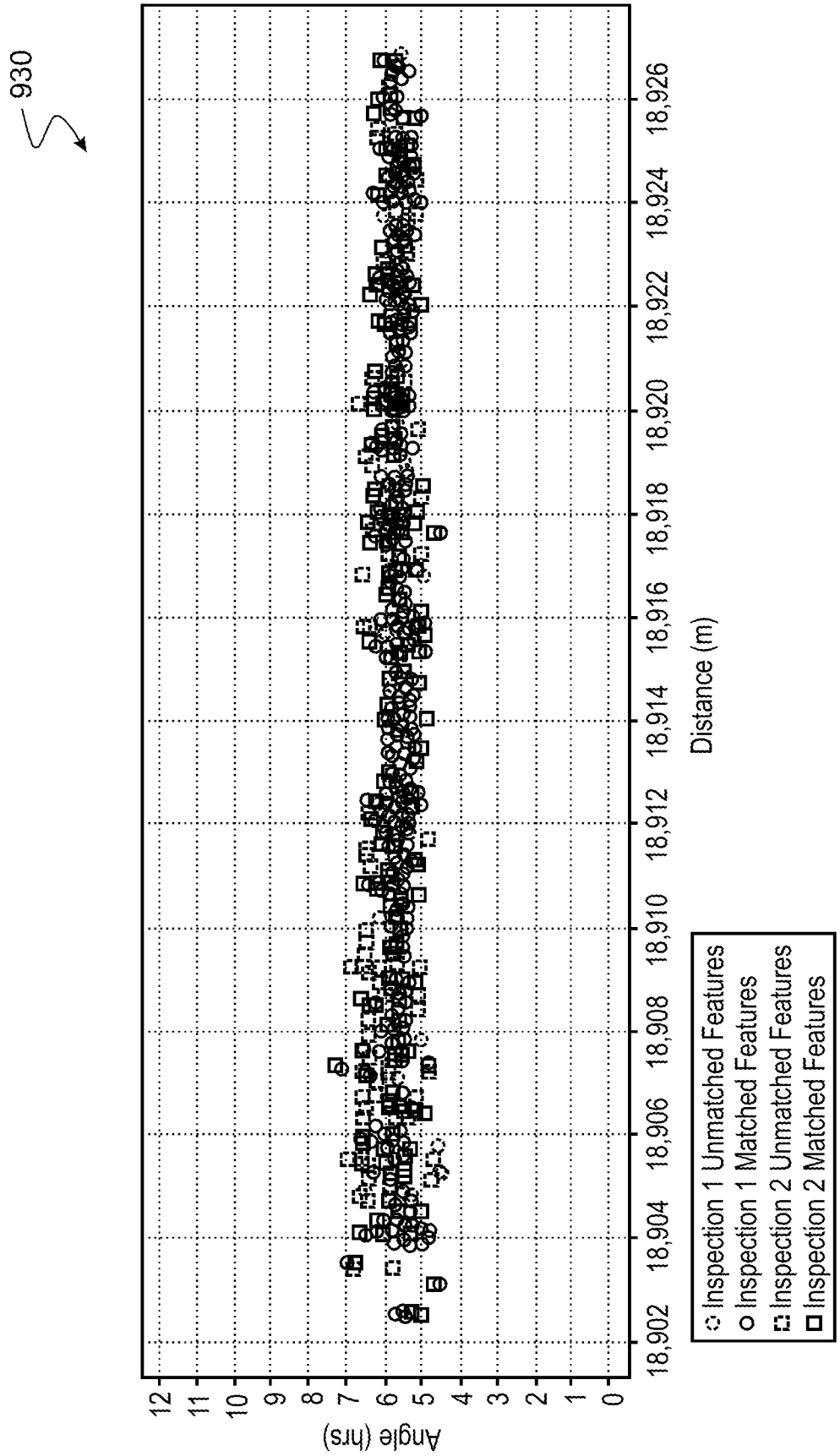
Figure 9D:
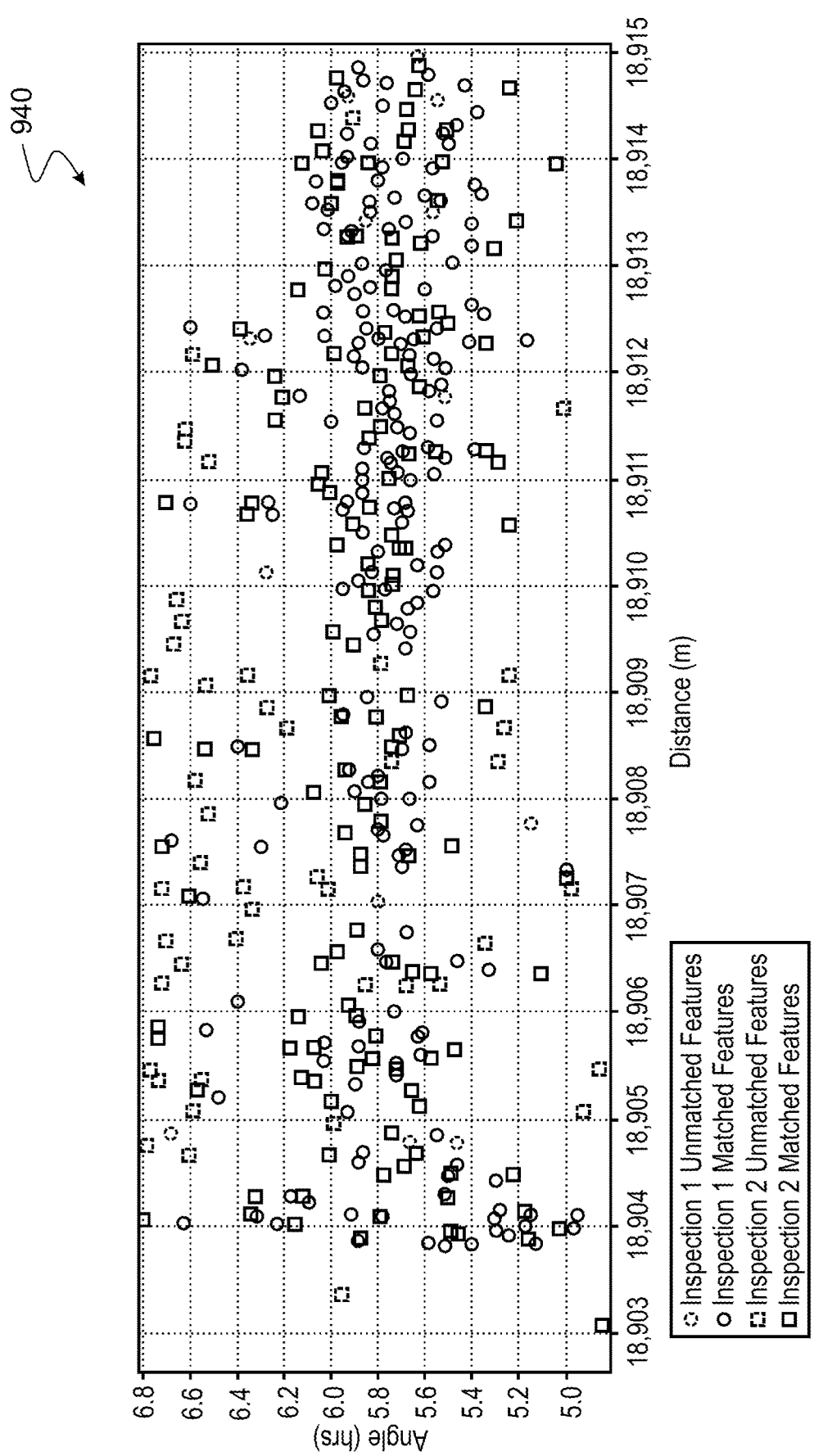

FIGS. 8A, 8B, and 8C illustrate examples results of the feature mapping process, according to an implementation. FIG. 8A includes diagram 810, which represents an example where each feature in inspection 1 is perfectly aligned with a corresponding feature in inspection 2. FIG. 8B includes diagram 820 and FIG. 8C includes diagram 830. Diagrams 820 and 830 illustrate the cases where some features are aligned, and some features in inspection 1 that are not matched. FIGS. 9A, 9B, 9C, and 9D illustrate additional example results of the feature mapping process, according to an implementation. FIG. 9A include diagrams 910 and FIG. 9B includes diagram 920. These diagrams represent examples where a number of new corrosions are present in inspection 2 because they have no match in inspection 1. The case in diagram 910 shows a faster corrosion growth rate than diagram 910 because it has a higher number of new features than diagram 920. FIG. 9C includes diagrams 930, which represent an example of heavy corrosions. FIG. 9D includes diagram 940, which is a zoomed version that presents a more detailed view of the matching of these features.

The corrosion management system 120 can output the matching results in one or more ways. For example, the corrosion management system 120 can output the matching results in a graphic format on a user interface of the corrosion management system 120. The graphic format can be similar to the diagrams shown in FIGS. 8 and 9 as discussed previously. Alternatively, or additionally, the result can be outputted in an alignment file. The alignment file can include a list of matched features and their relative locations in each inspection data set. The alignment file can also include analytical results that indicate whether the matching results fit in one or more of the seven cases discussed in FIG. 2.

In some cases, the corrosion management system 120 can further determine the corrosion growth rates based on the number of new features in inspection 2 that are not matched in inspection 1. For example, the corrosion growth rates can be calculated by dividing the number of new features over the duration between the two inspections that produce the corresponding data set. Additionally, or alternatively, the corrosion growth rate can be determined by comparing the information (for example, size and depth) of the features that are matched between the two inspections and calculating the differences of the matched features. In some cases, supplemental corrosion growth rate information can be further determined by dividing the corrosion growth rates over the length of the pipeline.

In some operations, the corrosion management system 120 can interact with physical equipment in the oil and gas production field to automatically adjust the oil and gas production operation based on the corrosion growth rates. For example, if the corrosion growth rate exceeds a configured threshold, the corrosion management system 120 can send a command to the corrosion inhibitor pumps to adjust inhibitor consumption, the corrosion management system 120 can also send a command to cathodic protection (CP) rectifiers that regulate the current in the production field. In some cases, the corrosion management system 120 can also send commands to the emergency shutdown system to shut down the production. The emergency shutdown system can include controllers that are configured to shut down the pumps and the drilling rigs. For example, the emergency shutdown system can close the emergency valves (ZV) and stop the pumps and drilling rigs in a production well. The emergency shutdown system can also send commands to venting, draining, and pressure relief valves to open these valves and stop the pressure build up.

Alternatively, or additionally, the corrosion management system 120 can instruct some cameras or sensors installed near or on the pipeline to be turned on if the corrosion growth rate exceeds a different threshold. This may provide the maintenance operators with a visual image to inspect the status of the corrosion. The corrosion management system 120 can also perform other responsive actions such as triggering alarms, generating or sending notifications or work orders to the maintenance operators for inspection or repair. In addition, the responsive actions can be configured for different corrosion growth rates. For example, the corrosion management system 120 can display different color codes on a user interface of the corrosion management system 120 corresponding to different corrosion growth rates. The corrosion management system 120 can also trigger audio alarms with different audio patterns and volumes corresponding to different corrosion growth rates.

Figure 10:
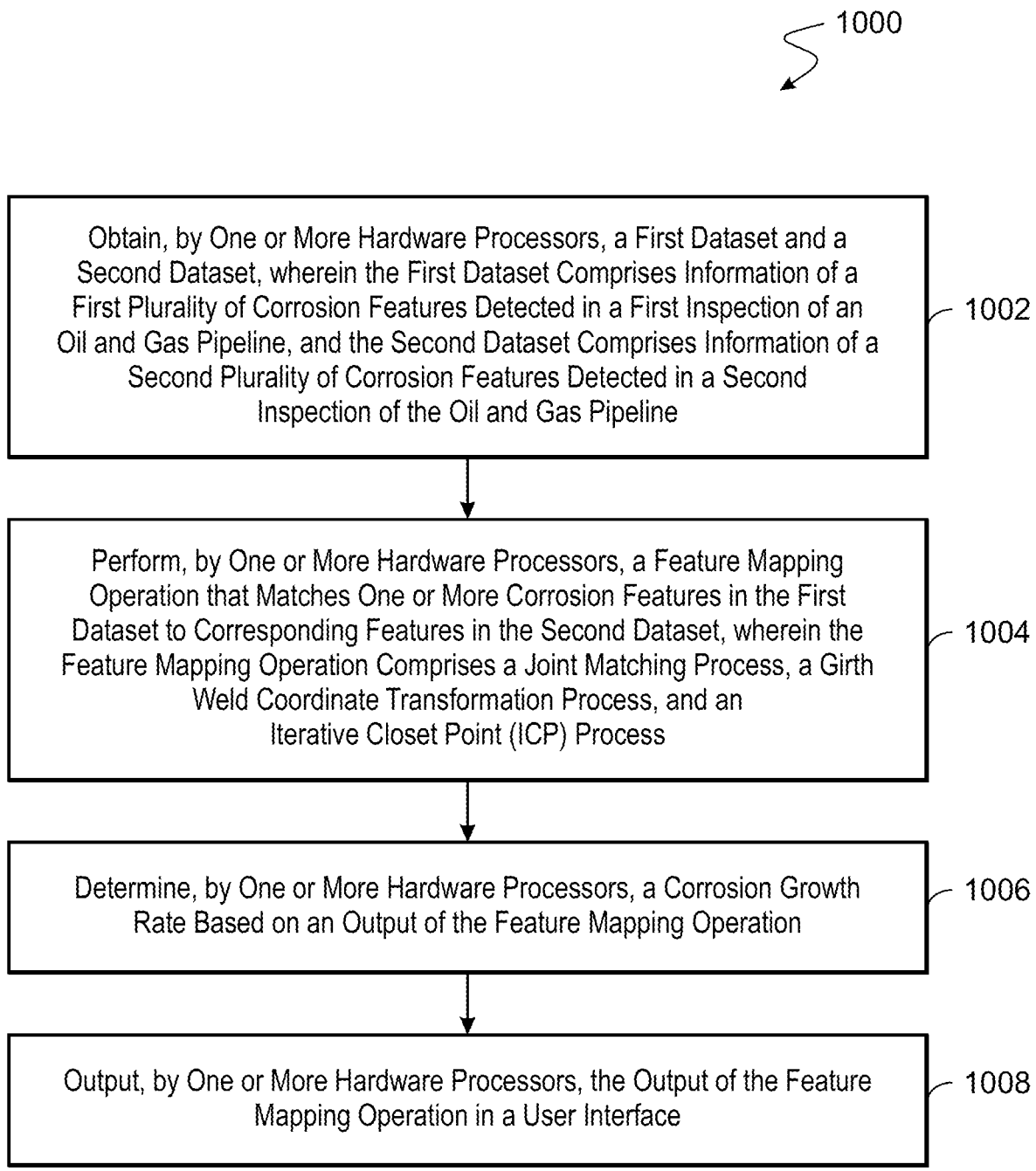
FIG. 10 illustrates an example method for adjusting oil and gas production operation based on corrosion growth rate, according to an implementation.

FIG. 10 illustrates an example method 1000 for adjusting an oil and gas production operation based on corrosion growth rates, according to an implementation. For clarity of presentation, the description that follows generally describes method 1000 in the context of FIGS. 1-5, 6A-6B, 7, 8A-8C, 9A-9D, and 11. The method 1000 can be performed by the corrosion management system 120 in FIG. 1 and other suitable systems, environments, software, and hardware, or a combination of systems, environments, software, and hardware, as appropriate. In some implementations, various steps of the method 1000 can be run in parallel, in combination, in loops, or in any order.

At 1002, a first dataset and a second dataset are obtained. The first dataset comprises information of a first plurality of corrosion features detected in a first inspection of an oil and gas pipeline, and the second dataset comprises information of a second plurality of corrosion features detected in a second inspection of the oil and gas pipeline. At 1004, a feature mapping operation is performed. The feature mapping operation matches one or more corrosion features in the first dataset to corresponding features in the second dataset, wherein the feature mapping operation comprises a joint matching process, a girth weld coordinate transformation process, and an iterative closet point (ICP) process. At 1006, a corrosion growth rate is determined based on an output of the feature mapping operation. At 1008, the output of the feature mapping operation is outputted in a user interface.

Figure 11:
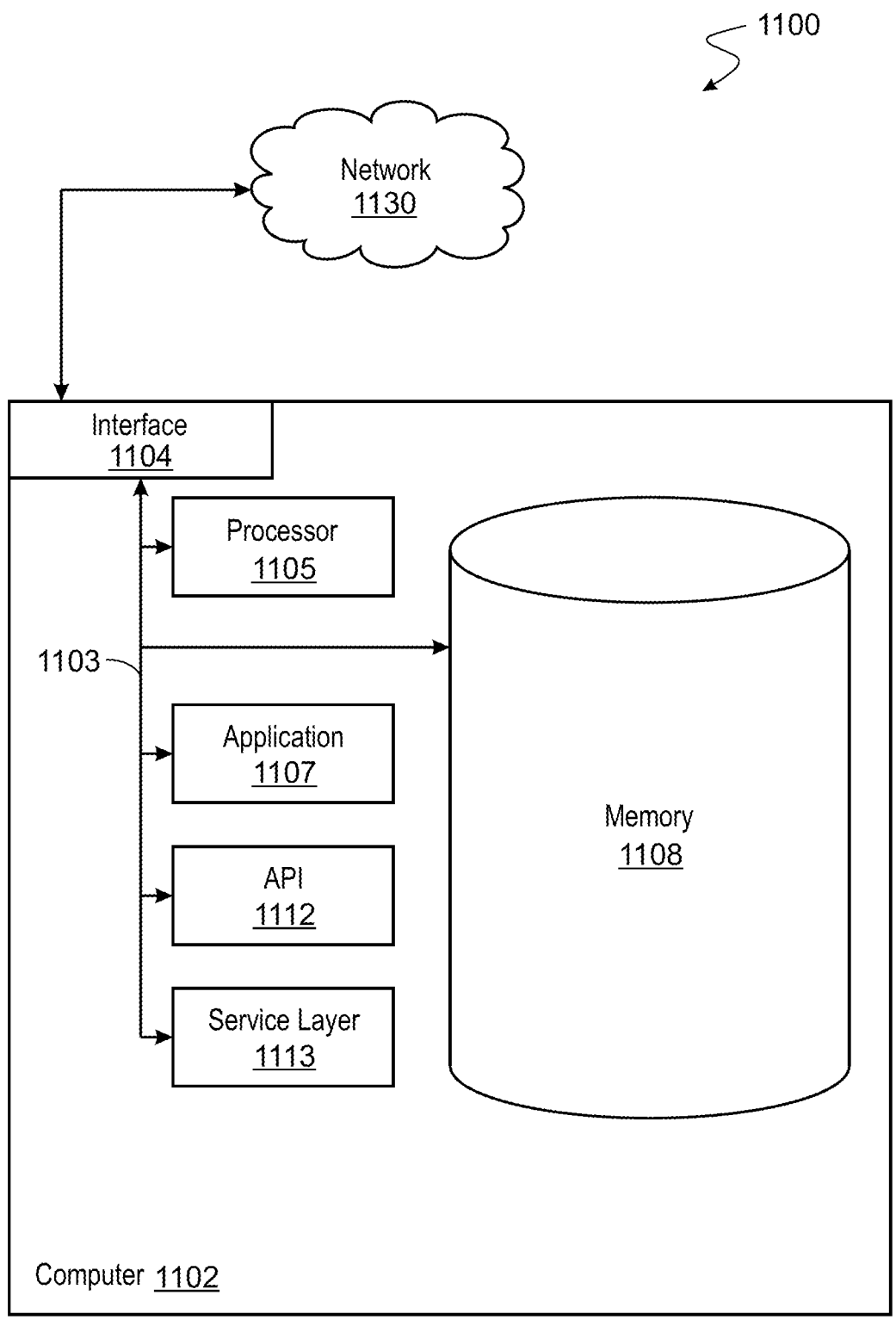
FIG. 11 is a high-level architecture block diagram of a computer system based on the methods described in this disclosure, according to an implementation.

FIG. 11 is a high-level architecture block diagram of a computer system 1100 based on the methods described in this disclosure, according to an implementation. At a high level, the illustrated computer system 1100 includes a computer 1102 coupled with a network 1130. The computer system 1100 can be used to implement the corrosion management system 120 discussed previously.

The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 1130 facilitates communication between the computer 1102 and other components, for example, components that obtain observed data for a location and transmit the observed data to the computer 1102. The network 1130 can be a wireless or a wireline network. The network 1130 can also be a memory pipe, a hardware connection, or any internal or external communication paths between the components.

The computer 1102 includes a computing system configured to perform the method as described in this disclosure. In some cases, the method can be implemented in an executable computing code, for example, C/C++ executable codes. In some cases, the computer 1102 can include a standalone LINUX system that runs batch applications. In some cases, the computer 1102 can include mobile or personal computers.

The computer 1102 may comprise a computer that includes an input device, such as a keypad, keyboard, touch screen, microphone, speech recognition device, other devices that can accept user information, or an output device that conveys information associated with the operation of the computer 1102, including digital data, visual or audio information, or a graphic user interface (GUI).

The computer 1102 can serve as a client, network component, a server, a database, or other persistency, or any other component of the computer system 1100. In some implementations, one or more components of the computer 1102 may be configured to operate within a cloud-computing-based environment.

At a high level, the computer 1102 is an electronic computing device operable to receive, transmit, process, store, or manage data and information associated with the computer system 1100. According to some implementations, the computer 1102 may also include, or be communicably coupled with, an application server, e-mail server, web server, caching server, streaming data server, business intelligence (BI) server, or another server.

The computer 1102 can receive requests over network 1130 from a client application (for example, executing on another computer 1102) and respond to the received requests by processing said requests in an appropriate software application. In addition, requests may also be sent to the computer 1102 from internal users (for example, from a command console), external or third parties, or other automated applications.

Each of the components of the computer 1102 can communicate using a system bus 1103. In some implementations, any or all the components of the computer 1102, both hardware or software, may interface with each other or the interface 1104, over the system bus 1103, using an application programming interface (API) 1112 or a service layer 1113. The API 1112 may include specifications for routines, data structures, and object classes. The API 1112 may be either computer language-independent or -dependent and refer to a complete interface, a single function, or even a set of APIs. The service layer 1113 provides software services to the computer 1102 or the computer system 1100. The functionality of the computer 1102 may be accessible for all service consumers using this service layer. Software services, such as those provided by the service layer 1113, provide reusable, defined business functionalities, through a defined interface. For example, the interface may be software written in JAVA, C++, or suitable language providing data in Extensible Markup Language (XML) format. While illustrated as an integrated component of the computer 1102, alternative implementations may illustrate the API 1112 or the service layer 1113 as stand-alone components in relation to other components of the computer 1102 or the computer system 1100. Moreover, any or all parts of the API 1112 or the service layer 1113 may be implemented as sub-modules of another software module, enterprise application, or hardware module, without departing from the scope of this disclosure.

The computer 1102 includes an interface 1104. Although illustrated as a single interface 1104 in FIG. 11, two or more interfaces 1104 may be used according to particular needs, desires, or particular implementations of the computer 1102 or computer system 1100. The interface 1104 is used by the computer 1102 for communicating with other systems in a distributed environment—including within the computer system 1100 connected to the network 1130 (whether illustrated or not). Generally, the interface 1104 comprises logic encoded in software or hardware in a suitable combination and operable to communicate with the network 1130. More specifically, the interface 1104 may comprise software supporting one or more communication protocols associated with communications such that the network 1130 or interface's hardware is operable to communicate physical signals within and outside of the illustrated computer system 1100.

The computer 1102 includes a processor 1105. Although illustrated as a single processor 1105 in FIG. 11, two or more processors may be used according to particular needs, desires, or particular implementations of the computer 1102 or the computer system 1100. Generally, the processor 1105 executes instructions and manipulates data to perform the operations of the computer 1102. Specifically, the processor 1105 executes the functionality required for processing geophysical data.

The computer 1102 also includes a memory 1108 that holds data for the computer 1102 or other components of the computer system 1100. Although illustrated as a single memory 1108 in FIG. 11, two or more memories may be used according to particular needs, desires, or particular implementations of the computer 1102 or the computer system 1100. While memory 1108 is illustrated as an integral component of the computer 1102, in alternative implementations, memory 1108 can be external to the computer 1102 or the computer system 1100.

The application 1107 is a software engine providing functionality according to particular needs, desires, or particular implementations of the computer 1102 or the computer system 1100, particularly with respect to functionality required for processing geophysical data. For example, application 1107 can serve as one or more components or applications described in FIGS. 1-10. Further, although illustrated as a single application 1107, the application 1107 may be implemented as multiple applications 1107, on the computer 1102. In addition, although illustrated as integral to the computer 1102, in alternative implementations, the application 1107 can be external to the computer 1102 or the computer system 1100.

There may be any number of computers 1102 associated with, or external to, the computer system 1100 and communicating over network 1130. Furthermore, the terms "client," "user," and other appropriate terminology may be used interchangeably, as appropriate, without departing from the scope of this disclosure. Moreover, this disclosure contemplates that many users may use one computer 1102, or that one user may use multiple computers 1102.

In some implementations, the described methodology can be configured to send messages, instructions, or other communications to a computer-implemented controller, database, or other computer-implemented system to dynamically initiate control of, control, or cause another computer-implemented system to perform a computer-implemented operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, activate/deactivate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically influence, direct, control, influence, or manage tangible, real-world equipment related to hydrocarbon production, analysis, and recovery or for other purposes consistent with this disclosure. For example, the response actions can include sending commands to the field to modify a wellbore trajectory, increase/decrease speed of or stop/start a hydrocarbon drill; activate/deactivate an alarm (such as, a visual, auditory, or voice alarm), or to affect refinery or pumping operations (for example, stop, restart, accelerate, or reduce). Other examples can include alerting geo-steering and directional drilling staff when underground obstacles have been detected (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Described implementations of the subject matter can include one or more features, alone or in combination.

For example, in a first implementation, a computer-implemented method comprising: obtaining, by one or more hardware processors, a first dataset and a second dataset, wherein the first dataset comprises information of a first plurality of corrosion features detected in a first inspection of an oil and gas pipeline, and the second dataset comprises information of a second plurality of corrosion features detected in a second inspection of the oil and gas pipeline; performing, by one or more hardware processors, a feature mapping operation that matches one or more corrosion features in the first dataset to corresponding features in the second dataset, wherein the feature mapping operation comprises a joint matching process, a girth weld coordinate transformation process, and an iterative closet point (ICP) process; determining, by one or more hardware processors, a corrosion growth rate based on an output of the feature mapping operation; and outputting, by one or more hardware processors, the output of the feature mapping operation in a user interface.

The foregoing and other implementations can each, optionally, include one or more of the following features, alone or in combination:

A first aspect, combinable with the general implementation, where the first dataset and the second dataset comprise In-line Inspection (ILI) datasets.

A second aspect, combinable with any of the previous or subsequent aspects, where the joint matching process is performed based on a joint tolerance threshold.

A third aspect, combinable with any of the previous or subsequent aspects, where the joint matching process is performed based on a look ahead window size.

A fourth aspect, combinable with any of the previous or subsequent aspects, where the girth weld coordinate transformation process comprises a transformation of the first plurality of corrosion features in the first dataset according to coordinates of girth welds in the pipeline.

A fifth aspect, combinable with any of the previous or subsequent aspects, where the ICP process comprises a translation of coordinates in x and y directions for the corrosion features in the first dataset and the second dataset.

A sixth aspect, combinable with any of the previous aspects, where the method further comprises: shutting down a production operation of the hydrocarbon reservoir based on the corrosion growth rate.

In a second implementation, a non-transitory computer-readable medium storing instructions which, when executed, cause a computer to perform operations comprising: obtaining a first dataset and a second dataset, wherein the first dataset comprises information of a first plurality of corrosion features detected in a first inspection of an oil and gas pipeline, and the second dataset comprises information of a second plurality of corrosion features detected in a second inspection of the oil and gas pipeline; performing a feature mapping operation that matches one or more corrosion features in the first dataset to corresponding features in the second dataset, wherein the feature mapping operation comprises a joint matching process, a girth weld coordinate transformation process, and an iterative closet point (ICP) process; determining a corrosion growth rate based on an output of the feature mapping operation; and outputting the output of the feature mapping operation in a user interface.

The foregoing and other implementations can each, optionally, include one or more of the following features, alone or in combination:

A first aspect, combinable with the general implementation, where the first dataset and the second dataset comprise In-line Inspection (ILI) datasets.

A second aspect, combinable with any of the previous or subsequent aspects, where the joint matching process is performed based on a joint tolerance threshold.

A third aspect, combinable with any of the previous or subsequent aspects, where the joint matching process is performed based on a look ahead window size.

A fourth aspect, combinable with any of the previous or subsequent aspects, where the girth weld coordinate transformation process comprises a transformation of the first plurality of corrosion features in the first dataset according to coordinates of girth welds in the pipeline.

A fifth aspect, combinable with any of the previous or subsequent aspects, where the ICP process comprises a translation of coordinates in x and y directions for the corrosion features in the first dataset and the second dataset.

A sixth aspect, combinable with any of the previous aspects, where the operations further comprise: shutting down a production operation of the hydrocarbon reservoir based on the corrosion growth rate.

In a third implementation, a device comprising: at least one hardware processor; and a non-transitory computer-readable storage medium coupled to the at least one hardware processor and storing programming instructions for execution by the at least one hardware processor, where the programming instructions, when executed, cause the at least one hardware processor to perform operations comprising: obtaining a first dataset and a second dataset, wherein the first dataset comprises information of a first plurality of corrosion features detected in a first inspection of an oil and gas pipeline, and the second dataset comprises information of a second plurality of corrosion features detected in a second inspection of the oil and gas pipeline; performing a feature mapping operation that matches one or more corrosion features in the first dataset to corresponding features in the second dataset, wherein the feature mapping operation comprises a joint matching process, a girth weld coordinate transformation process, and an iterative closet point (ICP) process; determining a corrosion growth rate based on an output of the feature mapping operation; and outputting the output of the feature mapping operation in a user interface.

The foregoing and other implementations can each, optionally, include one or more of the following features, alone or in combination:

A first aspect, combinable with the general implementation, where the first dataset and the second dataset comprise In-line Inspection (ILI) datasets.

A second aspect, combinable with any of the previous or subsequent aspects, where the joint matching process is performed based on a joint tolerance threshold.

A third aspect, combinable with any of the previous or subsequent aspects, where the joint matching process is performed based on a look ahead window size.

A fourth aspect, combinable with any of the previous or subsequent aspects, where the girth weld coordinate transformation process comprises a transformation of the first plurality of corrosion features in the first dataset according to coordinates of girth welds in the pipeline.

A fifth aspect, combinable with any of the previous or subsequent aspects, where the ICP process comprises a translation of coordinates in x and y directions for the corrosion features in the first dataset and the second dataset.

A sixth aspect, combinable with any of the previous aspects, where the operations further comprise: shutting down a production operation of the hydrocarbon reservoir based on the corrosion growth rate.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), a FPGA (field programmable gate array), or an ASIC (application-specific integrated circuit). In some implementations, the data processing apparatus or special purpose logic circuitry may be hardware-based or software-based. The apparatus can optionally include code that creates an execution environment for computer programs, for example, code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, or IOS.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random-access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business or dynamic information, and any other appropriate information including any parameters, variables, algorithms, instructions, rules, constraints, or references thereto. Additionally, the memory may include any other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20, and all or a portion of the Internet. The network may communicate with, for example, Internet Protocol (IP) packets, Frame Relay frames, Asynchronous Transfer Mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and software, may interface with each other or the interface using an application programming interface (API) or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API or service layer may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any disclosure or on the scope of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation or integration of various system modules and components in the implementations described previously should not be understood as requiring such separation or integration in all implementations, and it should be understood that the described program components and systems can generally be integrated together in a single software product or packaged into multiple software products.

Accordingly, the previous description of example implementations does not define or constrain this disclosure. Other changes, substitutions, and alterations are also possible without departing from the spirit and scope of this disclosure.

What is claimed is:

1. A computer-implemented method, comprising:
obtaining, by one or more hardware processors, a first dataset and a second dataset, wherein the first dataset comprises a first plurality of corrosion features detected in a first inspection of an oil and gas pipeline, and the second dataset comprises a second plurality of corrosion features detected in a second inspection of the oil and gas pipeline, wherein the oil and gas pipeline comprises a plurality of segments, each pair within the plurality of segments being joined by girth welds defining joints;

performing, by the one or more hardware processors, a joint-to-joint matching process comprising:
receiving, through a user interface, a value for a joint tolerance threshold being adjusted to match initial joints within the first dataset and the second dataset; and
comparing, using the value of the joint tolerance threshold, locations of the joints within the first dataset and the second dataset based on distance between subsequent joints defining the plurality of segments in the first dataset and in the second dataset to identify matching locations of the joints within the first dataset and the second dataset;

performing, by the one or more hardware processors, a girth weld coordinate transformation process by modifying a distance coordinate of the matching locations of the joints within the first dataset and the second dataset to generate a first transformed feature data set and a second transformed feature data set;

performing, by the one or more hardware processors, an iterative closest point (ICP) process comprising matching corrosion features with a nearest neighbor for each of the plurality of segments of the first transformed feature data set and the second transformed feature data set;

determining, by the one or more hardware processors, a corrosion growth rate over a length of the oil and gas pipeline based on the matching corrosion features for each of the plurality of segments;

generating, by the one or more hardware processors, a display of the corrosion growth rate over the length of the oil and gas pipeline; and shutting down a production operation of a hydrocarbon reservoir based on the corrosion growth rate.

2. The method of claim 1, wherein the first dataset and the second dataset comprise in-line Inspection (ILI) datasets.

3. The method of claim 1, wherein the joint-to-joint matching process is performed based on a look ahead window size.

4. The method of claim 1, wherein the girth weld coordinate transformation process comprises a transformation of the first plurality of corrosion features in the first dataset according to coordinates of girth welds in the oil and gas pipeline.

5. The method of claim 1, wherein the ICP process comprises a translation of coordinates in x and y directions for the corrosion features in the first dataset and the second dataset.

6. A device, comprising:
at least one hardware processor; and
a non-transitory computer-readable storage medium coupled to the at least one hardware processor and storing programming instructions for execution by the at least one hardware processor, wherein the programming instructions, when executed, cause the at least one hardware processor to perform operations comprising:
obtaining a first dataset and a second dataset, wherein the first dataset comprises a first plurality of corrosion features detected in a first inspection of an oil and gas pipeline, and the second dataset comprises a second plurality of corrosion features detected in a second inspection of the oil and gas pipeline, wherein the oil and gas pipeline comprises a plurality of segments, each pair within the plurality of segments being joined by girth welds defining joints;

performing a joint-to-joint matching process comprising:
receiving, through a user interface, a value for a joint tolerance threshold being adjusted to match initial joints within the first dataset and the second dataset; and
comparing, using the value of the joint tolerance threshold, locations of the joints within the first dataset and the second dataset based on distance between subsequent joints defining the plurality of segments in the first dataset and in the second dataset to identify matching locations of the joints within the first dataset and the second dataset;

performing a girth weld coordinate transformation process by modifying a distance coordinate of the matching locations of the joints within the first dataset and the second dataset to generate a first transformed feature data set and a second transformed feature data set;

performing an iterative closest point (ICP) process comprising matching corrosion features with a nearest neighbor for each of the plurality of segments of the first transformed feature data set and the second transformed feature data set;

determining a corrosion growth rate over a length of the oil and gas pipeline based on the matching corrosion features for each of the plurality of segments;

generating a display of the corrosion growth rate over the length of the oil and gas pipeline; and shutting down a production operation of a hydrocarbon reservoir based on the corrosion growth rate.

7. The device of claim 6, wherein the first dataset and the second dataset comprise In-line Inspection (ILI) datasets.

8. The device of claim 6, wherein the joint-to-joint matching process is performed based on a look ahead window size.

9. The device of claim 6, wherein the girth weld coordinate transformation process comprises a transformation of the first plurality of corrosion features in the first dataset according to coordinates of girth welds in the oil and gas pipeline.

10. The device of claim 6, wherein the ICP process comprises a translation of coordinates in x and y directions for the corrosion features in the first dataset and the second dataset.

11. A non-transitory computer-readable medium storing instructions which, when executed, cause a computing device to perform operations comprising:
obtaining a first dataset and a second dataset, wherein the first dataset comprises a first plurality of corrosion features detected in a first inspection of an oil and gas pipeline, and the second dataset comprises a second plurality of corrosion features detected in a second inspection of the oil and gas pipeline, wherein the oil and gas pipeline comprises a plurality of segments, each pair within the plurality of segments being joined by girth welds defining joints;

performing a joint-to-joint matching process comprising:
receiving, through a user interface, a value for a joint tolerance threshold being adjusted to match initial joints within the first dataset and the second dataset; and comparing, using the value of the joint tolerance threshold, locations of the joints within the first dataset and the second dataset based on distance between subsequent joints defining the plurality of segments in the first dataset and in the second dataset to identify matching locations of the joints within the first dataset and the second dataset;

performing a girth weld coordinate transformation process by modifying a distance coordinate of the matching locations of the joints within the first dataset and the second dataset to generate a first transformed feature data set and a second transformed feature data set;

performing an iterative closest point (ICP) process comprising matching corrosion features with a nearest neighbor for each of the plurality of segments of the first transformed feature data set and the second transformed feature data set;

determining a corrosion growth rate over a length of the oil and gas pipeline based on the matching corrosion features for each of the plurality of segments;

generating a display of the corrosion growth rate over the length of the oil and gas pipeline; and shutting down a production operation of a hydrocarbon reservoir based on the corrosion growth rate.

12. The non-transitory computer-readable medium of claim 11, wherein the first dataset and the second dataset comprise In-line Inspection (ILI) datasets.

13. The non-transitory computer-readable medium of claim 11, wherein the joint-to-joint matching process is performed based on a look ahead window size.

14. The non-transitory computer-readable medium of claim 11, wherein the girth weld coordinate transformation process comprises a transformation of the first plurality of corrosion features in the first dataset according to coordinates of girth welds in the oil and gas pipeline.

15. The non-transitory computer-readable medium of claim 11, wherein the ICP process comprises a translation of coordinates in x and y directions for the corrosion features in the first dataset and the second dataset.

* * * * *